United States Patent
Isozaki et al.

(10) Patent No.: US 9,859,536 B2
(45) Date of Patent: Jan. 2, 2018

(54) NONAQUEOUS ELECTROLYTE BATTERY INCLUDING A SEALED CASE, BATTERY PACK AND STORAGE BATTERY APPARATUS

(71) Applicant: Kabushiki Kaisha Toshiba, Minato-ku (JP)

(72) Inventors: Yoshiyuki Isozaki, Nerima (JP); Norio Takami, Yakohama (JP); Yasuyuki Hotta, Ota (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/579,075

(22) Filed: Dec. 22, 2014

(65) Prior Publication Data
US 2015/0188100 A1 Jul. 2, 2015

(30) Foreign Application Priority Data
Dec. 26, 2013 (JP) ................. 2013-270260

(51) Int. Cl.
*H01M 2/02* (2006.01)
*H01M 2/08* (2006.01)
(Continued)

(52) U.S. Cl.
CPC ............... *H01M 2/08* (2013.01); *H01M 2/06* (2013.01); *H01M 2/1016* (2013.01);
(Continued)

(58) Field of Classification Search
CPC .......... H01M 2/08; H01M 2/202; H01M 2/30; H01M 2/204; H01M 2/206; H01M 10/0525; H01M 2220/20; H01M 2220/30
(Continued)

(56) References Cited

U.S. PATENT DOCUMENTS 5,948,562 A 9/1999 Fulcher et al.
2001/0051298 A1* 12/2001 Hanafusa ............ H01M 2/0207
429/162
(Continued)

FOREIGN PATENT DOCUMENTS

CN 1291797 A 4/2001
CN 1331249 C 8/2007
(Continued)

OTHER PUBLICATIONS

Office Action issued on Mar. 3, 2016 in Korean Patent Application No. 10-2014-0187195 (with English language translation).

*Primary Examiner* — Gary Harris
(74) *Attorney, Agent, or Firm* — Oblon, McClelland, Maier & Neustadt, L.L.P.

(57) ABSTRACT

A nonaqueous electrolyte battery of the embodiment includes: an electrode group; a pair of electrode leads connected electrically to the positive electrode and the negative electrode of the electrode group; a battery case comprising an electrode group-housing part which houses the electrode group, a terminal-housing part which communicates with the electrode group-housing part and houses the respective electrode leads, and a welded sealing part which seals the electrode group-housing part and the terminal-housing part, wherein a through hole exposing a part of the respective electrode leads is formed on the terminal-housing part; and a resin sealant which seals a space between the terminal-housing part and the electrode leads exposed by the through hole, wherein the resin sealant is circularly provided in the through hole along the peripheral part of the through hole and is formed of a resin composition having a coefficient of thermal expansion within 8-50 ($\times 10^{-6}$/K) at 0° C. to 100° C.

13 Claims, 14 Drawing Sheets

(51) Int. Cl.
 *H01M 2/20* (2006.01)
 *H01M 2/30* (2006.01)
 *H01M 2/06* (2006.01)
 *H01M 2/10* (2006.01)
 *H01M 10/0525* (2010.01)

(52) U.S. Cl.
 CPC ............ *H01M 2/202* (2013.01); *H01M 2/30* (2013.01); *H01M 10/0525* (2013.01); *Y02E 60/122* (2013.01)

(58) Field of Classification Search
 USPC ........................................................ 429/181
 See application file for complete search history.

(56) References Cited

U.S. PATENT DOCUMENTS

| | | |
|---|---|---|
| 2005/0037259 A1 | 2/2005 | Maruyama |
| 2005/0164081 A1 | 7/2005 | Ogura et al. |
| 2006/0115723 A1 | 6/2006 | Ando et al. |
| 2007/0207379 A1* | 9/2007 | Hatta ................... H01M 2/0207 429/176 |
| 2009/0186270 A1 | 7/2009 | Harada et al. |
| 2010/0310911 A1* | 12/2010 | Yamamoto .......... H01M 2/0212 429/94 |
| 2015/0079448 A1 | 3/2015 | Isozaki et al. |

FOREIGN PATENT DOCUMENTS

| | | |
|---|---|---|
| JP | A-11-031486 | 2/1999 |
| JP | 2001-167744 A | 6/2001 |
| JP | 4199948 B2 | 12/2008 |
| JP | 2009-176513 A | 8/2009 |
| JP | 2010-277786 A | 12/2010 |
| JP | 4616005 B2 | 1/2011 |
| JP | 2011-228070 A | 11/2011 |
| JP | 2012-94374 A | 5/2012 |
| JP | 2015-60651 A | 3/2015 |
| KR | 10-2001-0087982 A | 9/2001 |
| WO | WO 03/096446 A1 | 11/2003 |
| WO | WO 2013/002058 A1 | 1/2013 |

* cited by examiner

NONAQUEOUS ELECTROLYTE BATTERY INCLUDING A SEALED CASE, BATTERY PACK AND STORAGE BATTERY APPARATUS

CROSS-REFERENCE TO RELATED APPLICATION

This application is based upon and claims the benefit of priority from Japanese Patent Application No. 2013-270260, filed Dec. 26, 2013, the entire contents of which are incorporated herein by reference.

FIELD

Embodiments described herein relate generally to a nonaqueous electrolyte battery, a battery pack and a storage battery device.

BACKGROUND

In recent years, nonaqueous electrolyte batteries, in which materials having the capability of absorbing and releasing lithium ions are used as a positive active material and a negative active material, are used in various applications such as power supplies for electric vehicles, power-assisted bicycles, UPS (uninterruptible power supply), and mobile devices such as mobile phones, notebook computers and smart phones. Also, the application of an electrical energy storage system, which uses a nonaqueous electrolyte battery in combination with a solar power or a wind power, etc., has been rapidly grown for the purpose of handling a recently increased concern about environmental problems such as global warming and large-scale disasters.

In these extensively broadened applications, the specifications required for batteries are different from those of conventional mobile devices. In the application of electrical energy storage, easy maintenance and a long service life are required in addition to high safety, high energy density (reduction in size and weight) and a low cost. Therefore, it is necessary to achieve the refinements to prevent nonaqueous electrolyte solutions from leaking to the outside of a nonaqueous electrolyte battery and to prevent moisture penetrating from the outside of a battery from deteriorating nonaqueous electrolytes.

By the way, as an exterior package for housing a positive electrode and a negative electrode, a member made of a film material is widely used instead of a conventional metallic can in order to achieve the further reductions in thickness and weight. Examples of a film material include a composite film in which an external impact protection film represented by a nylon film is prepared as an outermost layer, a metallic layer for moisture prevention and light shielding represented by an aluminum foil is prepared as an intermediate layer, and a thermally adhesive resin film for sealing an electrode group and electrolyte solutions is prepared as an innermost layer.

Known examples of an exterior package formed of a film material include the exterior package including the rectangular molded part (the rectangular cup part) produced by a deep drawing process, the four peripheral parts extending from the four sides of the cup part in horizontal directions, and the flat plate part connected to one of these peripheral parts. The cup part of the exterior package houses the positive electrode and negative electrode having the capability of absorbing and releasing lithium ions and the electrode group which has a lithium ion-conducting solid electrolyte layer or a separator interposed between the positive electrode and the negative electrode.

The terminals connected to the respective positive electrode and negative electrode of the electrode group extend to the outside along one or two peripheral parts except for the peripheral part connected to the flat plate part of the exterior package. Also, this exterior package is arranged such that the thermally adhesive resin films of the film materials on the cup part side and the flat plate part side face each other when the flat plate part of the exterior package is bent on the axis of the peripheral part toward the cup part at an angle of 180°. The thermoplastic insulating films having a metallic adhesion property are provided between the extended parts of the terminals and the thermally adhesive resin films of the flat plate part. Alternatively, the thermoplastic insulating films having a metallic adhesion property are preliminarily provided at the thermally adhesive parts of the terminals. When the flat plate part of the exterior package is bent at an angle of 180° and the three peripheral parts are heat-sealed except for the peripheral part connected to the flat plate part, the aforementioned electrode group is airtightly housed in the aforementioned exterior package.

DESCRIPTION OF EMBODIMENTS

A nonaqueous electrolyte battery of the embodiment includes:

an electrode group having a positive electrode and a negative electrode;

a pair of plate-shaped terminal parts connected electrically to the positive electrode and the negative electrode of the electrode group;

a metallic battery case comprising an electrode group-housing part which houses the electrode group, a terminal-housing part which communicates with the electrode group-housing part and houses the terminal part, and a welded sealing part which seals the electrode group-housing part and the terminal-housing part, wherein a through hole exposing a part of the terminal-group is formed on the terminal-housing part; and a resin sealant which seals a space between the terminal-housing part and the terminal part exposed by the through hole, wherein the resin sealant is circularly provided in the through hole along the peripheral part of the through hole and is formed of a resin composition having a coefficient of thermal expansion within a range of 8 to 50 ($\times 10^{-6}$/K) at 0° C. to 100° C.

Hereinafter, the embodiments will be described with reference to the drawings. The same or analogous reference signs are put to the common or analogous features in the following drawings. However, the drawings are schematic ones, and it should be noted that the relationship between thickness and planar dimensions, and ratio of thicknesses of respective layers are different from actual devices. Thus, specific thicknesses and dimensions should be determined in consideration of the following description. In addition, please note that relationship and ratio of dimensions may be different among the drawings.

Moreover, the following embodiments illustrates the examples of an apparatus and method for reducing the technical idea of the invention to practice, and the technical idea of the invention does not specify the materials, shapes, structures and arrangements, etc. of components to the following ones. The technical idea of the invention can be appropriately changed within the range of the Claims.

[First Embodiment]

Hereinafter, the first embodiment will be described with reference to FIG. 1 to FIG. 5C.

Figure 1:
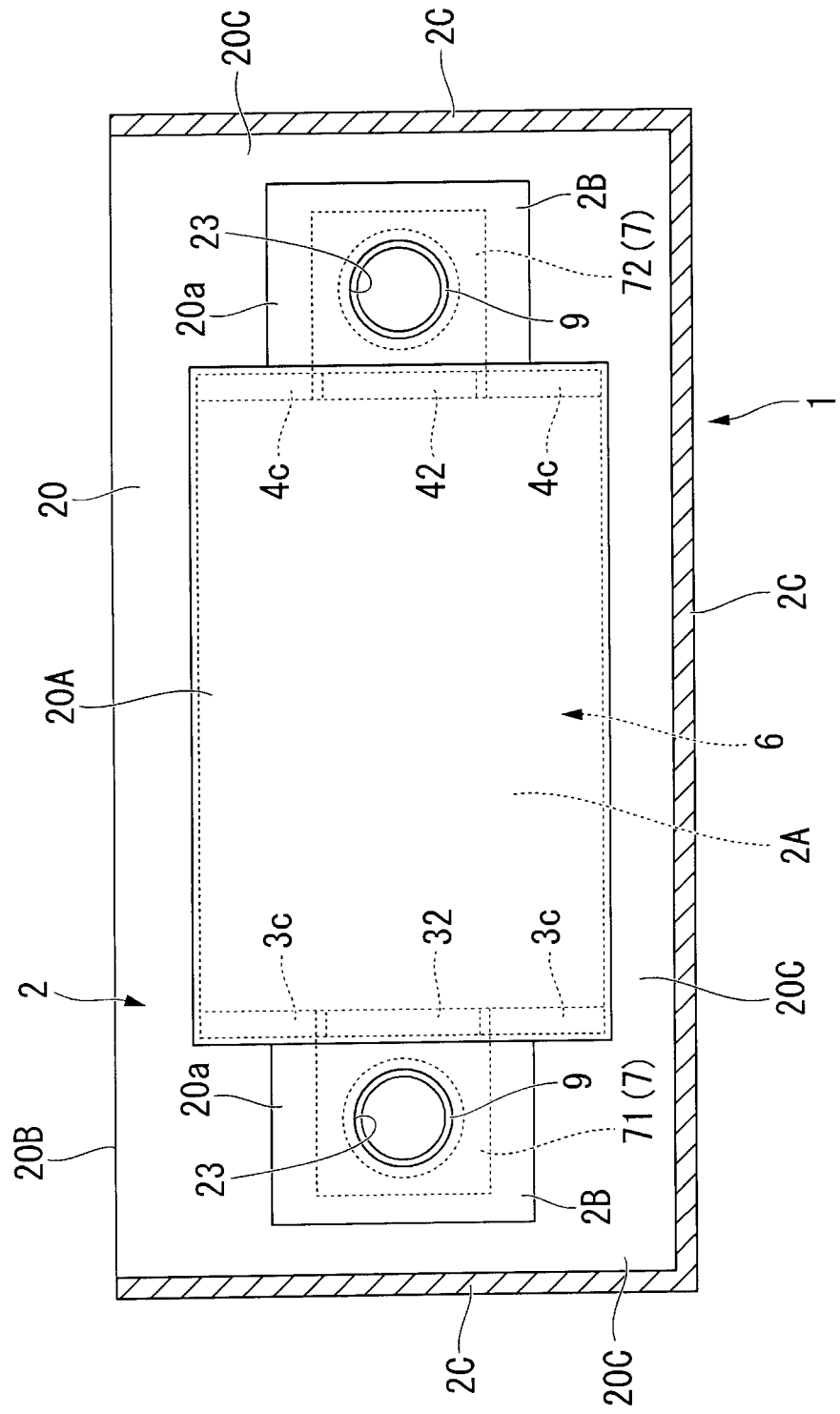
FIG. 1 is a schematic planar view illustrating a nonaqueous electrolyte battery according to the first embodiment.
Figure 2:
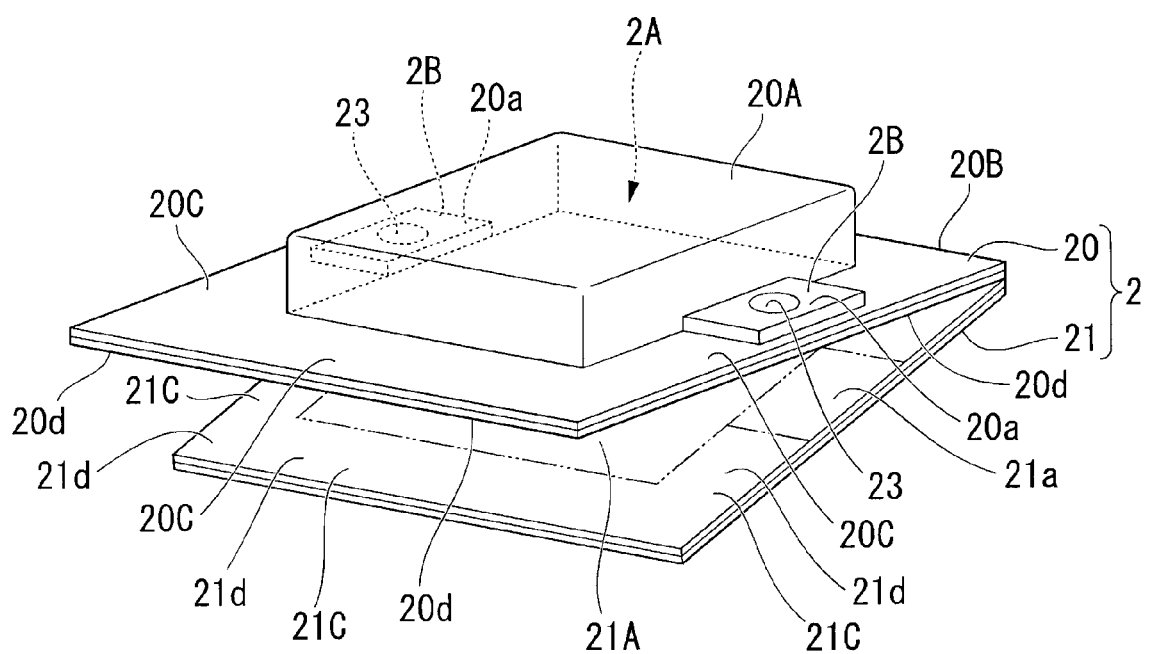
FIG. 2 is a perspective view illustrating a battery case of a nonaqueous electrolyte battery according to the first embodiment.
Figure 3:
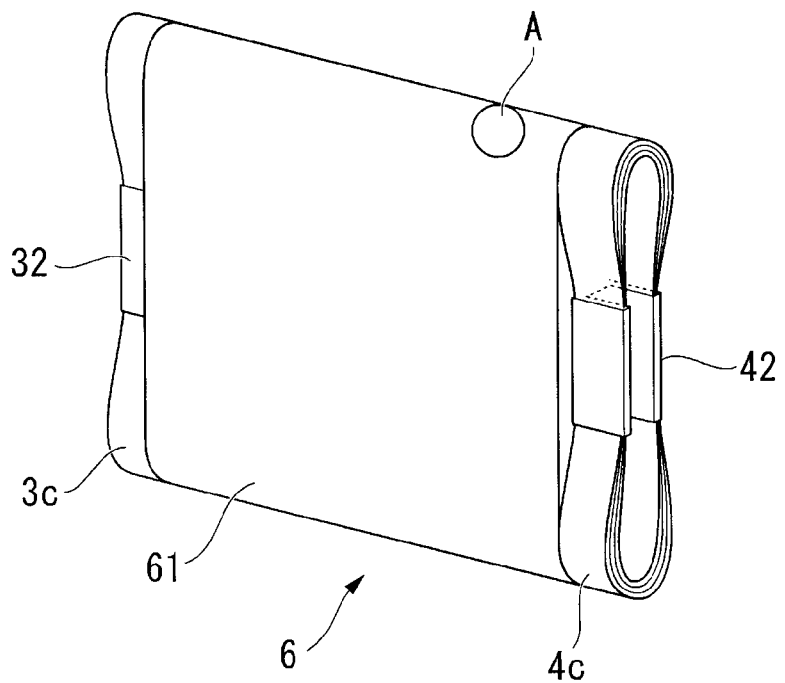
FIG. 3 is a perspective view illustrating an electrode group of a nonaqueous electrolyte battery according to the first embodiment.
Figure 4:
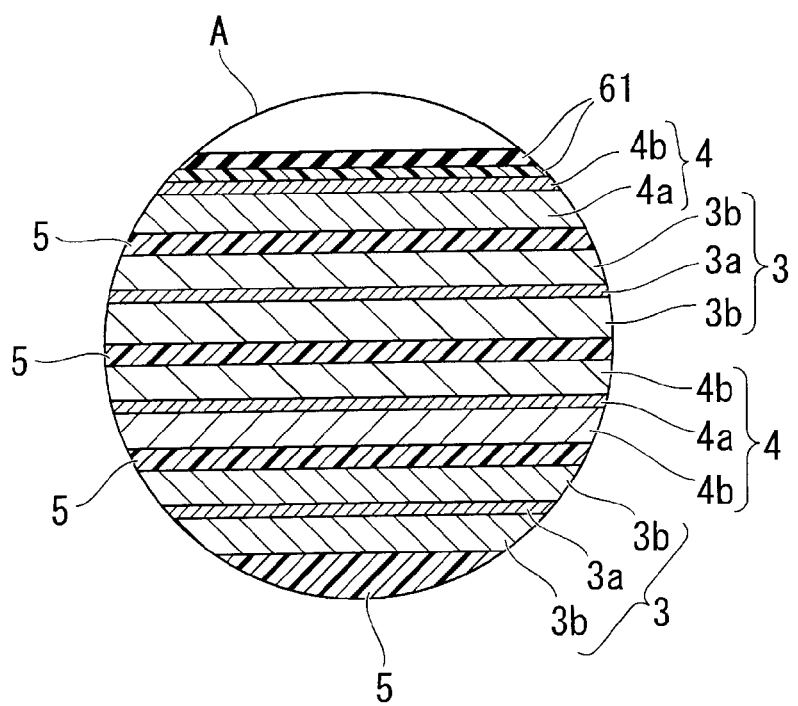
FIG. 4 is a schematic enlarged cross-sectional view illustrating the A-part of FIG. 3.

The nonaqueous electrolyte battery 1 of the first embodiment shown in FIG. 1 to FIG. 5C includes the electrode group 6, the details of which are shown in FIG. 3 and FIG. 4.

More specifically, the nonaqueous electrolyte battery 1 includes, as shown in FIG. 1, the electrode group 6, a pair of the plate-shaped terminal parts 7 connected electrically to the electrode group 6 and the battery case 2 which houses the electrode group 6 and the terminal part 7. Also, as shown in FIG. 4, the electrode group 6 includes the positive electrode 3 and the negative electrode 4. Also, the terminal part 7 is comprised of an electrode lead 71 connected to the positive electrode 3 of the electrode group 6, and the electrode lead 72 connected to the negative electrode 4 of the electrode group 6.

As shown in FIG. 3 and FIG. 4, the electrode group 6 has a flat-shaped wound-type structure in which the positive electrode 3, the negative electrode 4 and the separator 5 which separates the positive electrode 3 and negative electrode 4 are laminated and spirally wound. Also, the nonaqueous electrolyte which is not illustrated is held in the electrode group 6.

Also, the negative electrode 4 is located at the outermost periphery of the electrode group 6. The separator 5, the positive electrode 3, the separator 5, the negative electrode 4, the separator 5, the positive electrode 3 and the separator 5 are located in this order on the side of the inner periphery of the negative electrode 4.

As shown in FIG. 4, the positive electrode 3 includes the strip-shaped positive electrode current collector 3a and the positive electrode layer 3b that is formed on both sides of the positive electrode current collector 3a. Also, the negative electrode 4 includes the strip-shaped negative electrode current collector 4a and the negative electrode layers 4b that are formed on both sides of the negative electrode current collector 4a. The negative electrode layer 4b is formed on one side of the negative electrode current collector 4a at the portion located at the outermost periphery of the negative electrode 4.

This electrode group 6 can be obtained by laminating the strip-shaped positive electrode 3, the strip-shaped negative electrode 4 and the separator 5 interposed between these electrodes so as to form the electrode group assembly, spirally winding this electrode group assembly, and subsequently pressing this in a flat shape.

The positive electrode material-unsupported part 3c, in which the positive electrode layer 3b is not formed, is formed on one side in the width direction of the positive electrode current collector 3a. Also, the negative electrode material-unsupported part 4c, in which the negative electrode layer 4b is not formed, is formed on one side in the width direction of the negative electrode current collector 4a. Further, when the positive electrode 3 and negative electrode 4 are wound, the positive electrode material-unsupported part 3c is arranged so as to extend to one side of the axial direction of the winding axis of the electrode group 6. Also, the electrode group 6 is configured such that the negative electrode material-unsupported part 4c is arranged so as to extend to the other side of the axial direction of the winding axis of the electrode group 6.

As shown in FIG. 3, the positive electrode material-unsupported part 3c is equipped with the positive electrode current collector tab 32. The positive electrode current collector tab 32 is the member which has a current collecting function and bundles the positive electrode material-unsupported part 3c which is the end part of the spirally wound positive electrode current collector 3a. This positive electrode current collector tab 32 is electrically connected to the electrode lead 71 that constitutes the terminal part 7. In the same manner, the negative electrode material-unsupported part 4c is equipped with the negative electrode current collector tab 42. The negative electrode current collector tab 42 is the member which has a current collecting function and bundles the negative electrode material-unsupported part 4c which is the end part of the spirally wound negative electrode current collector 4a. This negative electrode current collector tab 42 is electrically connected to the electrode lead that constitutes the terminal part 7. As shown in FIG. 1, the respective electrode leads 71 and 72 extend from the electrode group 6 in opposite directions to each other.

For example, ultrasonic welding can be employed for the welding of the positive electrode material-unsupported part 3c and the positive electrode current collector tab 32, the welding of the negative electrode material-unsupported part 4c and the negative electrode current collector tab 42, the welding of the positive electrode current collector tab 32 and the electrode lead 71, and the welding of the negative electrode current collector tab 42 and the electrode lead 72.

Furthermore, as shown in FIG. 3, the electrode group 6 is wound by the insulating tape 61. The insulating tape 61 is used to wind the electrode group 6 around the position except for the both ends of the winding axis. In this manner, the insulating tape 61 is used to wind the position except for the positive electrode material-unsupported part 3c, the negative electrode material-unsupported part 4c, the positive electrode current collector tab 32 and the negative electrode current collector tab 42.

Herein, the shape of the electrode group 6 is not limited to the structure as described in the embodiment, and it is possible to employ an electrode group of the other various shapes.

For example, in the case of a laminated electrode group, the electrode group can be prepared by housing a positive electrode or a negative electrode in a bag-shaped separator and alternately laminating these respective electrodes, or by alternately sandwiching a positive electrode and a negative electrode while arranging a strip-shaped separator in a switchback shape.

Also, the positive electrode current collector 3, the positive electrode layer 3b, the negative electrode current collector 4a, the negative electrode layer 4b and the separator 5, which constitute the electrode group 6 will be described below in details.

Next, the battery case 2 is, as shown in FIG. 1 and FIG. 2, comprised of the first casing unit 20 having a substantially rectangular planer shape and the rectangular plate-shaped second casing part 21 whose principal surface is opposite to the first casing unit 20. In the example shown in FIG. 2, the first casing unit 20 and the second casing unit 21 are connected to each other through the bent part 20B, but the first casing unit 20 and the second casing part 21 are not necessarily connected and can be separate members.

The battery case 2 shown in FIG. 1 and FIG. 2 is comprised of the electrode group-housing part 2A which houses the electrode group 6 (see FIG. 1, etc.), the terminal-housing part 2B which communicates with the electrode group-housing part 2A and houses the terminal part 7, and the welded sealing part 2C which seals the electrode group-housing part 2A and the terminal-housing part 2B (see FIG. 1, etc.). These electrode group-housing part 2A, the terminal-housing part 2B and the welded sealing part 2C are configured by integrating the first casing unit 20 and the second casing part 21. Hereinafter, the first casing unit 20 and the second casing part 21 will be described.

The first casing unit 20 and the second casing unit 21 are, for example, formed by a metallic thin plate such as stainless steel plate or nickel-plated steel plate.

The first casing unit 20 is formed by subjecting a metallic thin plate to a deep drawing process or press working, and is comprised of the housing part 20A which is rectangular concave part, the plate-shaped extending portion 20C provided so as to extend from the four sides defining the housing part 20A toward the outer periphery of a metallic thin plate, and the two fixing part 20a provided in the extending portion 20C. One fixing part 20a is placed at the position adjacent to one side of the four sides defining the housing part 20A, and the other fixed portion 20a is provided at the position adjacent to the side opposite to the side on which the one fixed portion 20a is provided. The respective fixing parts 20a, 20a are formed by swelling a part of the plate-shaped extending part 20C toward the side on which the housing part 20A is extended, and are adjacent to the housing part 20A. The respective fixing parts 20a, 20a communicate with the housing part 20A. Also, the through hole 23 is provided in the fixing parts 20a, 20a. Also, the outer peripheral part of the metallic thin plate forming the first casing unit 20 except for the bent part 20B is used as the part to be welded 20d.

Next, the second casing unit 21 is formed by a metallic thin plate, and is arranged to face the first casing unit 20 in the formation of the battery case 2. This second casing unit 21 is comprised of the plate-shaped housing part 21A which is provided at the position facing the housing part 20A of the first casing unit 20, the plate-shaped extending portion 21C provided so as to extend from the four sides defining the housing part 21A toward the outer periphery of a metallic thin plate, and the two fixing part 21a provided in the extending portion 21C (one fixing part is not illustrated in FIG. 2). The fixing part 21a of the second casing unit 21 is formed as the specific region in the plate-shaped extending part 21C, and is not subjected to the swelling molding differently from the fixing part 20a of the first casing unit 20, and is configured as the plate-shaped region extended from the extending part 21C. Also, the fixing part 21a is adjacent to the housing part 21A in the same manner as the first casing unit 20. Moreover, the outer peripheral part of the metallic thin plate forming the second casing unit 21 except for the bent part 20B is used as the part to be welded 21d.

The second casing unit 21 shown in FIG. 2 is a plate-shaped member formed by processing a metallic thin plate in a substantially rectangular shape, but the second casing unit 21 is not limited to this, and the housing part can be swelled in the same manner as in the first casing unit 20.

The battery case 2 is formed by laminating the first casing unit 20 and the second casing unit 21 so as to face each other, subjecting the laminated parts to be welded 20d, 21d to seam welding, and integrating the first casing unit 20 and the second casing unit 21. Also, the electrode group-housing part 2A is configured by integrating the respective housing parts 20A, 21A, and the terminal-housing part 2B is configured by integrating the respective fixing parts 20a, 21a. Also, the through holes 23 provided in the first casing unit 20 become the through holes for exposing the electrode leads 71, 72 housed in the terminal-housing parts 2B. Moreover, the welded sealing part 2C, which seals the electrode group-housing part 2A and the terminal-housing part 2B (see FIG. 1, etc.), is configured by welding the parts to be welded 20d, 21d which are the outer peripheral parts of the first casing unit 20 and the second casing unit 21.

Figure 5A:
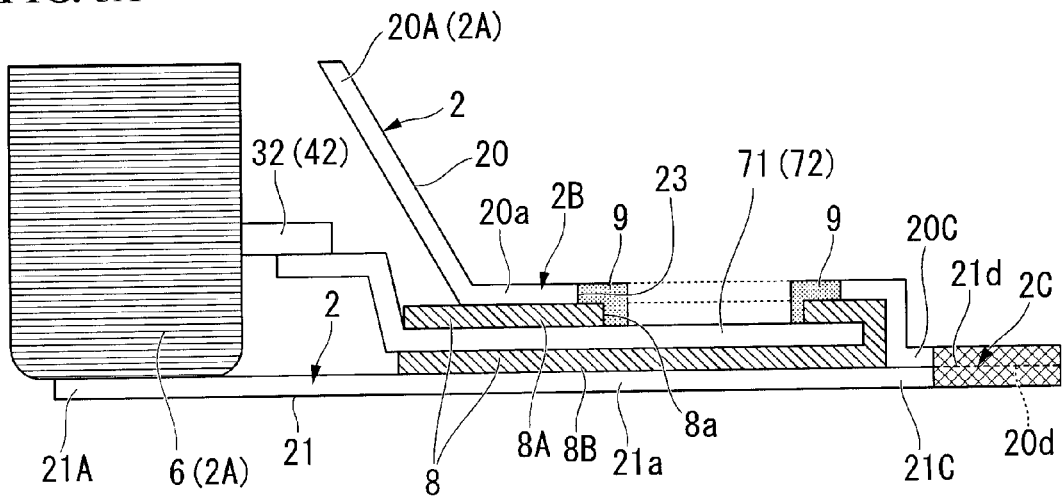
FIG. 5A is a schematic cross-sectional view illustrating a main part of a nonaqueous electrolyte battery according to the first embodiment.

FIG. 5A illustrates the enlarged cross-sectional view of the electrode group-housing part 2A and the terminal-housing part 2B. As shown in FIG. 5A, the electrode group 6 is housed in the electrode group-housing part 2A of the battery case 2, and the electrode leads 71, 72 (terminal sections) are respectively housed in the terminal-housing part 2B, 2B. Also, the electrode lead 71 and the electrode lead 72 housed in the terminal-housing part 2B, 2B are partially extended into the electrode group-housing part 2A, and are connected to the positive electrode current collector tab 32 and the negative electrode current collector tab 42 of the electrode group 6.

In FIG. 5A, in order to emphasize the existence of the terminal-housing part 2B, the interval between the fixing parts, which is the height of the terminal-housing part 2B, is illustrated in an exaggerated manner. However, as described in detail below, in the terminal-housing part 2B, the respective electrode leads 71 and 72 are clamped by the fixed parts 20a, 21a, and thus, the distance between the fixing parts is sufficient as long as it corresponds to the thickness of the electrode leads 71, 72. In other words, the terminal-housing part 2B provided in the battery case 2 can actually have a smaller height than the height shown in FIG. 5A. The same applies to the other figures attached to the specification.

The insulating resin layers 8 formed of an insulating material such as a resin are inserted between the fixed parts 20a, 21a and the electrode leads 71, 72. The insulating resin layers 8 insulate between the battery case 2 and the electrode leads 71, 72. The insulating resin layer 8B on the side of the second casing unit 21 is preferably formed to have an enough size to cover at least the electrode leads 71, 72, and more preferably formed to have an enough size to cover the fixing part 21a. Also, the insulating resin layer 8A on the side of the first casing unit 20 is preferably formed to have an enough size to cover at least the electrode leads 71, 72, and more preferably formed to have an enough size to cover the fixing part 20a. However, it is preferable that the through hole 8a which communicates with the through hole 23 of the battery case 2 be formed in the insulating resin layer 8A on the side of the first casing unit 20. Also, the electrode leads 71, 72 and the respective insulating resin layers 8A, 8B can be bonded, heat-sealed or crimped to each other, or can be only placed as long as the function of the present invention can be obtained. In the similar manner, the fixing parts 20a, 21a and the respective insulating resin layers 8A, 8B can be bonded, heat-sealed or crimped to each other, or can be only placed as long as the function of the present invention can be obtained.

The electrode leads 71, 72 are fixed in the terminal-housing part 2B by being clamped and fixed between the fixing part 20a of the first casing unit 20 and the fixing part 21a of the second casing unit 21. The configuration for fixing the electrode lead 71, 72 is not particularly limited. For example, the electrode leads 71, 72 can be fixed in the terminal-housing part 2B by bonding or heat-sealing the electrode leads 71, 72 and the fixing parts 20a, 21a through the insulating resin layers 8A, 8B which are placed between the fixing parts 20a, 21a and the electrode leads 71, 72. Alternatively, the electrode leads 71, 72 can be fixed in the terminal-housing part 2B by clamping the electrode leads 71, 72 and the fixing parts 20a, 21a through the insulating resin layers 8A, 8B.

Moreover, the circular resin sealant 9 is provided in the terminal-housing part 2B. As shown in FIG. 5A, the resin sealant 9 is formed to cover the end surface of the through hole 23 provided in the fixing part 20a of the first casing unit 20, the end surface of the through hole 8a provided in the insulating resin layer 8A, the end part of the boundary surface between the fixing part 20a and the insulating resin layer 8A, a part of the electrode leads 71(72), and the end part of the boundary surface between the electrode leads 71(72) and the insulating resin layer 8A. The electrode leads 71, 72 are exposed on the insides of the circular resin sealants 9. The electrode leads 71, 72 are exposed to the outside through the circular resin sealants 9, the through holes 8a of the insulating resin layers 8A and the through holes 23 of the fixing parts 20a. For this reason, the nonaqueous electrolyte battery 1 can obtain electrical conduction to the outside through the electrode leads 71, 72 exposed to the outside.

Figure 5B:
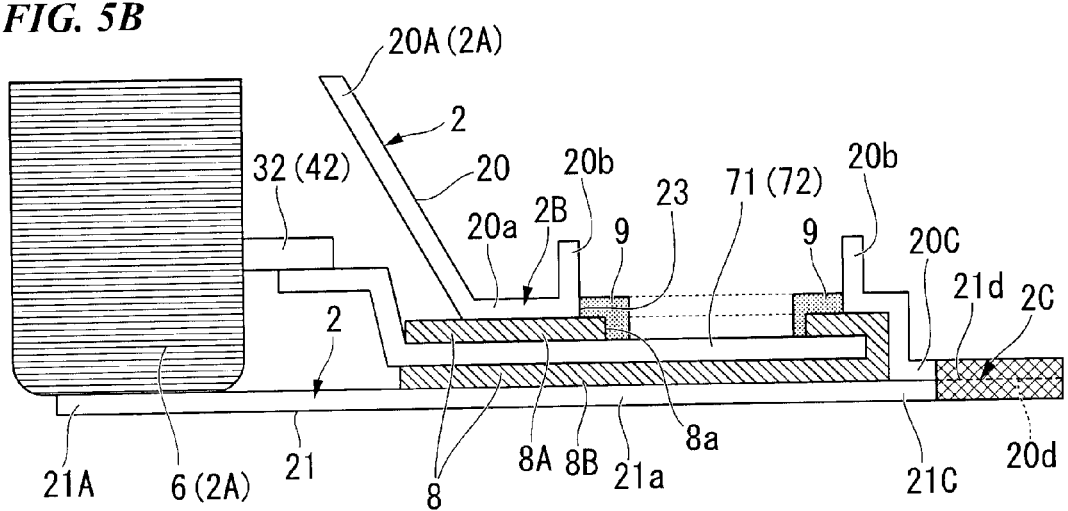
FIG. 5B is a schematic cross-sectional view illustrating a main part of a nonaqueous electrolyte battery according to the first embodiment.
Figure 5C:
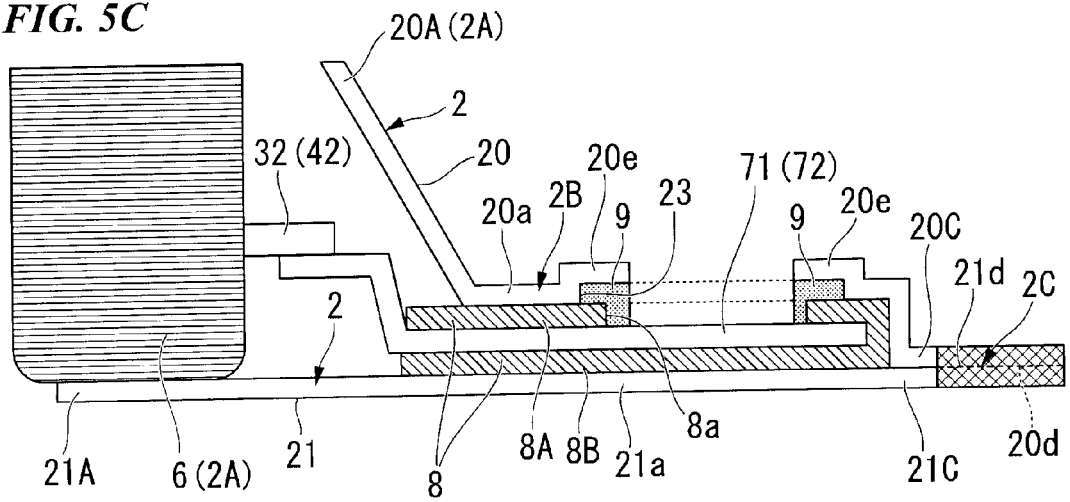
FIG. 5C is a schematic cross-sectional view illustrating a main part of a nonaqueous electrolyte battery according to the first embodiment.

Herein, the peripheral shape and fixed form of the resin sealant 9 in the nonaqueous electrolyte battery 1 of the present embodiment is not limited to the example shown in FIG. 5A. For example, in the same manner as the example shown in FIG. 5B and FIG. 5C, it is possible to employ the configuration obtained by providing the resin sealant 9 and then subjecting the terminal-housing part 2B of the battery case 2 to a swaging process. In FIG. 5B and FIG. 5C, the part to be swaged 20b shows the shape before a swaging process, and the swaged part 20e shows the shape after a swaging process. The resin sealant 9 is fixed by forming this swaged part.

In the battery case 2 of the present embodiment, the first casing unit 20 and the second casing unit 21 are welded so as to each other to form the welded sealing part 2C, and thus, the electrode group-housing part 2A is sealed from the external environment of the battery, but moisture, etc. can penetrate from the external environment through the through hole 23 provided in the fixing part 20a. However, in order to take out the electrode leads 71, 72 connected to the electrode group 6 to the outside, it is unavoidable to form the through hole 23 which can be a path for moisture penetration. In the present embodiment, the formation of the circular resin sealant 9 seals the end part of the boundary surface between the fixing part 20a of the first casing unit 20 and the insulating resin layer 8A, and the end part of the boundary surface between the electrode leads 71, 72 and the insulating resin layer 8A. Accordingly, the electrode group-housing part 2A is completely sealed. Because including the resin sealant 9 in this manner, the nonaqueous electrolyte battery 1 of the present embodiment has the configuration in which moisture can be prevented from penetrating through the spaces between the electrode leads 71, 72 and the battery case 2.

The resin sealant 9 of the present embodiment is formed of the resin composition having a coefficient of thermal expansion (linear expansion coefficient) within a range of 8 to 50 ($\times 10^{-6}$/K) at 0° C. to 100° C. When the coefficient of thermal expansion of the resin sealant 9 is set within a range of 8 to 50 ($\times 10^{-6}$/K), the coefficient of thermal expansion of the resin sealant 9 is close to the coefficient of thermal expansion of the metallic case. Thereby, it is possible to decrease the thermal stress due to temperature change during charging and discharging, which is caused by the difference in the coefficient of thermal expansion between the resin sealant 9 and the metallic member constituting the battery case 2. Also, it is possible to suppress the resin sealant 9 from cracking or breaking. Moreover, the coefficient of thermal expansion of the resin composition forming the resin sealant 9 is preferably within a range of 10 to 20 ($\times 10^{-6}$/K).

It is preferable that the resin composition forming the resin sealant 9 be the thermosetting resin composition having a glass transition point of 120° C. or higher. When the resin sealant 9 is formed of the thermosetting resin composition having a glass transition point of the aforementioned temperature, it is possible to suppress the resin sealant 9 from cracking or breaking and to improve the sealing property as described above. In addition, it is possible to more significantly obtain the technical effect to improve the airtightness of the inside of the battery case 2. A coefficient of thermal expansion rapidly increases above a glass transition point. For this reason, when a glass transition point is 120° C. or lower, it becomes difficult to keep the property showing a coefficient of thermal expansion within a range of 8 to 50 ($\times 10^{-6}$/K) at 100° C. or lower, and the sealing property can be deteriorated. Thus, the glass transition point of the resin composition forming the resin sealant 9 is preferably 120° C. or higher, and more preferably 140° C. or higher.

Also, the resin composition forming the resin sealant 9 is preferably polyimide, an epoxy resin or an inorganic filler-containing epoxy resin composition. In particular, an inorganic filler-containing epoxy resin composition is more preferable because it is possible to improve the strength of the sealing part of the resin sealant 9 and to obtain the moisture penetration-preventing effect.

When the resin sealant 9 is formed of an inorganic filler-containing epoxy resin composition, silica or alumina can be used as inorganic fillers. Also, when the resin sealant 9 is formed of an inorganic filler-containing epoxy resin composition, inorganic fillers have to be charged such that the coefficient of thermal expansion is within the aforementioned range. In addition, it is preferable to adjust the charging amount of inorganic fillers such that a glass transition point is within the aforementioned range. Also, the charging percentage of inorganic fillers in an inorganic filler-containing epoxy resin composition is preferably 85 mass % or lower.

Also, as the epoxy resin composition used in the resin sealant 9, it is possible to use a liquid type composition and a solid type composition. When a liquid type epoxy resin composition is used, it is possible to use the method in which sealing is carried out by putting the resin on the part to be sealed and then applying heat so as to cure the resin. Also, it is possible to use the method in which sealing is carried out by cast molding using a die which can form a resin layer only at the part to be sealed. When a solid type epoxy resin composition is used, it is possible to use the method in which sealing is carried out by preliminarily mixing inorganic fillers and the resin composition at the temperature that does not initiate curing to thereby obtain the compound, forming the compound in a sheet shape, placing these sheets on the part to be sealed, and then carrying out press molding. Also, it is possible to use the method in which sealing is carried out by forming the compound in a pellet shape and then carrying out transfer molding. Any of these methods can be used, and an appropriate method can be selected according to the characteristics of the resin composition to be used and the shape of the casing to be sealed.

In the present embodiment, by using the aforementioned configuration, it is possible to significantly suppress moisture penetration from the outside into the inside of the battery case 2. For example, it is possible to surely prevent the expansion of the battery and the leakage of the nonaqueous electrolyte to the outside, and to achieve the reliable nonaqueous electrolyte battery 1.

In other words, the nonaqueous electrolyte battery 1 according to the present embodiment can prevent moisture from penetrating through the terminal-housing part 2B, and thus, it is possible to prevent the moisture contained in the outside air from reaching the electrode group 6. Therefore, the nonaqueous electrolyte battery 1 can prevent the contact between the electrode group 6 and the moisture contained in the outside air.

In this manner, the nonaqueous electrolyte battery 1 can prevent the moisture contact of the electrode group 6, and thus, it is possible to prevent the deterioration of the electrode group 6 such as the expansion of the electrode group 6 for a long period. As a result, the nonaqueous electrolyte battery 1 according to the first embodiment can have a long service life.

Moreover, in the fixing parts 20a, 21a, parts of the electrode leads 71, 72 connected electrically to the electrode group 6 are exposed through the through holes 23, 23, and thus, the nonaqueous electrolyte battery 1 can easily and surely obtain the electrical conduction to the electronic devices and/or other batteries.

In the nonaqueous electrolyte battery 1 of the present embodiment, the insulating resin layer 8 is bonded or heat-sealed to the fixing parts 20a, 21a and the electrode leads 71, 72, and thus, can prevent moisture from penetrating into the inside of the battery case 2 through the through holes 23, 23 together with the resin sealant 9. Conclusively, it is possible to prevent the moisture contact of the electrode group 6.

Also, in the nonaqueous electrolyte battery 1 of the present embodiment, the welded sealing part 2C is sealed by seam welding, and thus, it is possible to suppress the moisture penetration through this the welded sealing part 2C. Conclusively, it is possible to prevent the moisture contact of the electrode group 6. For this reason, it is possible to prevent the deteriorations such as the expansion of the electrode group for a longer period.

In the examples shown in FIG. 1 and FIG. 2, the through holes 23 and 23 are formed in a circular shape in a planar view, but the through hole is not limited to this. For example, other planar shape such as rectangle can be employed.

The following detailed description relates to the constituent members of the nonaqueous electrolyte battery 1 of the present embodiment including the positive electrode 3, the negative electrode 4, the separator 5, the nonaqueous electrolyte (not illustrated), the electrode lead 71, the electrode lead 72, the battery case 2, and the insulating resin layer 8.

(1) Positive Electrode

The positive electrode 3 includes the positive electrode current collector 3a and the positive electrode layer 3b that is formed on one side or both sides of the positive electrode current collector 3a and includes a positive electrode active material, a conducting agent, and a binding agent. Usable examples of the positive electrode active material include an oxide, a sulfide or a polymer.

Examples of the positive electrode active material include various oxides and sulfides. Examples thereof includes manganese dioxide ($MnO_2$), an iron oxide, a copper oxide, a nickel oxide, a lithium—manganese composite oxide (for example, $Li_xMn_2O_4$ or $Li_xMnO_2$ (wherein $0<x<1.2$)), a lithium—nickel composite oxide (for example, $Li_xNiO_2$ (wherein $0<x<1.2$)), a lithium—cobalt composite oxide ($Li_xCoO_2$ (wherein $0<x<1.2$)), a lithium—nickel—cobalt composite oxide (for example, $Li_xNi_{1-y}Co_yO_2$ (wherein $0<x<1.2$ and $0<y<1$)), a lithium—manganese—cobalt composite oxide (for example, $Li_xMn_yCo_{1-y}O_2$ (wherein $0<x<1.2$ and $0<y<1$)), a lithium—nickel—cobalt—manganese composite oxide (for example, $Li_xNi_{1-y-z}Co_yMn_zO_2$ (wherein $0<x<1.2$, $0<y<1$ and $0<z<1$)), a spinel type lithium—manganese—nickel composite oxide ($Li_xMn_{1.5}Ni_{0.5}O_4$ (wherein $0<x<1.2$)), a lithium—phosphorus oxide having an olivine structure (such as $Li_xFePO_4$, $Li_xFe_{1-y}Mn_yPO_4$, $Li_xMnPO_4$, $Li_xMn_{1-y}Fe_yPO_4$ or $Li_xCoPO_4$ (wherein $0<x<1.2$ and $0<y<1$)), iron sulfate ($Fe_2(SO_4)_3$), and a vanadium oxide (for example, $V_2O_5$).

Usable examples of the polymer used for the positive electrode active material, include a conductive polymer material such as polyaniline or polypyrrole, or a disulfide-based polymer material.

Also, an inorganic material or an organic material such as sulfur (S) or carbon fluoride can also be exemplified as the positive electrode active material.

Of the above examples, preferable examples of the positive electrode active materials include a spinel type lithium—manganese ($Li_xMn_2O_4$ (wherein $0<x<1.2$)), an olivine type lithium—iron phosphate ($Li_xFePO_4$ (wherein $0<x<1.2$)), an olivine type lithium—manganese phosphate ($Li_xMnPO_4$ (wherein $0<x<1.2$)), and an olivine type lithium—manganese—iron phosphate ($Li_xMn_{1-y}Fe_yPO_4$ (wherein $0<x<1.2$ and $0<y<1$)). In addition, it is possible to use the mixture of the two or more kinds of these examples.

Of the above examples, more preferable examples of the positive electrode active materials are an olivine type lithium—iron phosphate ($Li_xFePO_4$ (wherein $0<x<1.2$)), an olivine type lithium—manganese phosphate ($Li_xMnPO_4$ (wherein $0<x<1.2$)), and an olivine type lithium—manganese—iron phosphate ($Li_xMn_{1-y}Fe_yPO_4$ (wherein $0<x<1.2$ and $0<y<1$)).

These positive electrode active materials have the lower water resistance than the other positive electrode active materials. For this reasons, when moisture is penetrated into the battery which uses lithium perchlorate ($LiClO_4$) or lithium hexafluorophosphate ($LiPF_6$), etc. as a nonaqueous electrolyte, an acid such as a chlorate ($HClO_4$) or hydrofluoric acid (HF) is produced by the reaction of a nonaqueous electrolyte and water. This acid promotes the elution of iron or manganese from positive electrode active materials, which causes the problems such as capacity deterioration and lifespan reduction of a battery. Because a nonaqueous electrolyte battery of the embodiment has the battery structure in which the amount of moisture penetration from the outside of the battery is small, excellent lifespan property of a lithium phosphate with an olivine structure can be obtained by using these preferable examples as a positive electrode active material.

Also, because these olivine type positive electrode active materials have low electron conductivity, it is preferable to apply carbon coating on the particle surface in order to impart conductivity. In this case, the preferable range of the amount of carbon coating is within a range of 1% by mass to 5% by mass.

Also, when an ambient temperature molten salt is used as the nonaqueous electrolyte, it is preferable to use a lithium iron phosphate, $Li_xVPO_4F$, a lithium—manganese composite oxide, a lithium—nickel composite oxide, or a lithium—nickel—cobalt composite oxide in terms of a cycle lifespan. This is because reactivity between the positive electrode active material and the ambient temperature molten salt is small.

The conducting agent improves the power collection performance of the positive electrode active material and suppresses contact resistance between the positive electrode active material and the positive electrode current collector. Examples of the conducting agent include an agent containing acetylene black, carbon black, artificial graphite, natural graphite, or a conductive polymer.

The binding agent fills spaces among the dispersed positive electrode active materials to thereby bind the positive active material and the conducting agent, and bind the positive electrode active material and the positive electrode collector. Examples of the binding agent include agents containing polytetrafluoroethylene (PTFE), polyvinylidene fluoride (PVdF), and fluorine-based rubber. As the binding agent, modified PVdF in which at least one group is substituted by another substituent, a copolymer of vinylidene fluoride and propylene hexafluoride, and a terpolymer of polyvinylidene fluoride, tetrafluoroethylene, and propylene hexafluoride can be used in association with the above materials.

For example, N-methyl-2-pyrrolidone (NMP) or dimethylformamide (DMF) can be used as an organic solvent dispersing the binding agent.

In the positive electrode layer 3b, the positive electrode active material and the binding agent are preferably mixed at ratios of 80% by mass or more and 98% by mass or less, and 2% by mass or more and 20% by mass, or less respectively. By setting the amount of the binding agent to be 2% by mass or more, sufficient electrode intensity can be obtained. By setting the amount of the binding agent to be 20% by mass or less, it is possible to reduce a mixture amount of insulator of the electrode and reduce internal resistance.

Also, when the conducting agent is added to the positive electrode layer 3b, the positive electrode active material, the conducting agent, and the binding agent are mixed at ratios of 77% by mass or more and 95% by mass or less, 2% by mass or more and 20% by mass or less, and 3% by mass or more and 15% by mass or less, respectively, and are more preferably mixed at ratios of 80% by mass or more and 95% by mass or less, 3% by mass or more and 18% by mass or less, and 2% by mass or more and 17% by mass or less, respectively.

By setting a content of the conducting agent to be 3% by mass or more, it is possible to obtain the above-described advantages. By setting the content of the conducting agent to be 18% by mass or less, it is possible to reduce decomposition of the nonaqueous electrolyte on the conductive agent surface in high temperature preservation.

The positive electrode current collector 3a is preferably, for example, an aluminum foil or an aluminum alloy foil containing an element such as Mg, Ti, Zn, Mn, Fe, Cu, or Si, having the thickness of 8 μm to 25 μm. A stainless foil or a titanium foil, etc. can also be used as the positive electrode collector 3a. Also, the thickness of an aluminum foil or an aluminum alloy foil is preferably 20 μm or less and more preferably 15 μm.

When the foregoing aluminum foil is used as the positive electrode current collector 3a, the purity of the aluminum foil is preferably 99% or more.

Also, when the aforementioned aluminum alloy foil is used as the positive current electrode collector 3a, it is preferable to suppress a content of a transition metal such as Fe, Cu, Ni or Cr to 1% by mass or less.

Also, in an aluminum foil or aluminum alloy foil used for the positive electrode current collector 3a, the average crystal particle size thereof is preferably 50 μm or less, more preferably 30 μm or less, and much more preferably 5 μm or less. When the average crystal particle size of an aluminum foil or aluminum alloy foil used for the positive electrode current collector 3a is 50 μm or less, it is possible to drastically increase the strength of the positive electrode current collector 3a. Also, it is possible to densify the positive electrode 3 with a high pressing pressure, and it is possible to increase the battery capacity.

An aluminum foil or aluminum alloy foil having the average crystal particle size of 50 μm or less is complexly affected by multiple factors such as material textures, impurities, processing conditions, thermal treatment history, and annealing conditions, and the aforementioned crystal particle size is adjusted by the combination of various factors in the manufacturing process.

The positive electrode 3 can be produced, for example, by suspending the positive electrode active material, the conducting agent, and the binding agent in a general solvent to prepare a slurry, applying the slurry to the positive electrode current collector 3a and performing drying, and then performing pressing. Also, the positive electrode 3 may be produced by forming the positive electrode active material, the conducting agent, and the binding agent in a pellet form to make the positive electrode layer 3b, and disposing and forming the positive electrode layer 3b on the positive electrode current collector 3a.

(2) Negative Electrode

The negative electrode 4 includes the negative electrode current collector 4a and the negative electrode layer 4b that is formed on one side or both sides of the negative electrode current collector 4a and includes a negative electrode active material, a conducting agent, and a binding agent.

Usable examples of the negative electrode active material include carbonaceous materials, metal oxides, metal sulfides, metal nitrides, alloys and lightweight metals, which can absorb and release lithium ions.

Examples of carbonaceous materials which can absorb and release lithium ions include cokes, carbon fibers, pyrolytic gas phase carbon materials, graphites, resin-based burned substances, mesophase pitch-based carbon fibers, and burned substances of mesophase spherical carbons. Of these, it is preferable to use mesophase pitch-based carbon fibers and mesophase spherical carbons, which have been graphitized at 2500° C. or higher, because it is possible to increase the electrode capacity.

Examples of metal oxides include titanium-containing metal composite oxides, tin-based oxides such as $SnB_{0.4}P_{0.6}O_{3.1}$ and $SnSiO_3$, silicon-based oxides such as SiO, and tungsten-based oxide such as $WO_3$. Of these metal oxides, it is preferable to use the negative electrode active material having a potential higher than 0.5 V with respect to metal lithium, e.g. titanium-containing metal composite oxides such as lithium titanates because lithium dendrite can be prevented from generating in the negative electrode even when the battery is rapidly charged, and further the deterioration can be prevented.

Examples of titanium-containing metal composite oxides include titanium-based oxides which contains no lithium at the time of the synthesis of oxides, lithium titanium oxides, and lithium titanium composite oxides obtained by substituting a part of constituent elements of lithium titanium oxides with at least one heteroatom selected from the group constituting of Nb, Mo, W, P, V, Sn, Cu, Ni and Fe. Examples of lithium titanium oxides include the lithium titanate having the spinel structure (for example, $Li_{4+x}Ti_5O_{12}$ (x is the value that can vary within the range of $0 \leq x \leq 3$ according to charging and discharging)), the ramsdellite-type lithium titanate (for example, $Li_{2+y}Ti_3O_7$ (y is the value that can vary within the range of $0 \leq y \leq 3$ according to charging and discharging)), and the niobium titanium oxide (for example, $Li_xNb_aTiO_7$ ($0 \leq x$, more preferably $0 \leq x \leq 1$, and $1 \leq a \leq 4$)).

Examples of titanium-based oxides include $TiO_2$ and metal composite oxides containing at least one element selected from the group consisting of Ti and P, V, Sn, Cu, Ni, Co and Fe. It is preferable that $TiO_2$ have the anatase type structure and the low crystallinity obtained by heat treatment temperature of 300° C. to 500° C. Also, Examples of metal composite oxides containing at least one element selected from the group consisting of Ti and P, V, Sn, Cu, Ni, Co and Fe include $TiO_2$—$P_2O_5$, $TiO_2$—$V_2O_5$, $TiO_2$—$P_2O_5$—$SnO_2$, $TiO_2$—$P_2O_5$-MeO (Me is at least one element selected from the group consisting of Cu, Ni, Co and Fe). It is preferable that the metal composite oxides have the microstructure having both of a crystalline phase and an amorphous phase or the microstructure of amorphous phase alone. When the metal composite oxides used for the negative electrode active material has such microstructure, it is possible to significantly improve the cycle performance of the nonaqueous electrolyte battery. In addition, lithium titanium oxides and metal composite oxides containing at least one element selected from the group consisting of Ti and P, V, Sn, Cu, Ni, Co and Fe are preferred among the metal composite oxides.

Examples of metal sulfides include lithium sulfide ($Li_2S$), molybdenum sulfide ($MoS_2$), iron sulfides (FeS, $FeS_2$ and $Li_xFeS_2$ (wherein $0 < x \leq 1$)).

Also, examples of metal nitrides include lithium cobalt nitrides ($Li_xCo_yN$ (wherein $0 < x < 4$, $0 < y < 0.5$)).

Also, it is more preferable to use lithium titanate having the spinel structure as a negative electrode active material. Moreover, it is also preferable to use the mixture of lithium titanate having the spinel structure and $TiO_2$ as a negative electrode active material.

The conducting agent improves the power collection performance of the negative electrode active material and suppresses contact resistance between the negative electrode active material and the negative electrode current collector. Examples of the conducting agent include agents containing acetylene black, carbon black, coke, a carbon fiber, and graphite.

The binding agent fills spaces between the dispersed negative electrode active materials to thereby bind the negative active material and the conducting agent, and bind the negative electrode active material and the negative electrode collector. Examples of the binding agent include agents containing polytetrafluoroethylene (PTFE), polyvinylidene fluoride (PVdF), fluorine-based rubber, styrene-butadiene rubber (SBR), an ethylene-propylene-diene copolymer (EPDM), and carboxymethyl cellulose (CMC).

In the negative electrode layer 4b, the negative electrode active material, the conducting agent, and the binding agent are preferably mixed at ratios of 68% by mass or more and 96% by mass or less, 2% by mass or more and 30% by mass or less, and 2% by mass or more and 30% by mass or less, respectively. The negative electrode active material, the conducting agent, and the binding agent are more preferably mixed at ratios of 70% by mass or more and 96% by mass or less, 2% by mass or more and 28% by mass or less, and 2% by mass or more and 28% by mass or less, respectively.

By setting the amount of the conducting agent to be 2% by mass or more, it is possible to improve the power collection performance of the negative layer 4b, and to improve the large current characteristics of the nonaqueous electrolyte battery 1.

Also, by setting the amount of binding agent to be 2% by mass or more, it is possible to improve the binding property of the negative electrode layer 4b and the negative electrode current collector 4a, and to improve the cycle characteristics.

On the other hand, in terms of large capacity, it is preferable to set the conducting agent and the binding agent to be 28% by mass or less.

The negative electrode current collector 4a is preferably an aluminum foil which is electrochemically stable within a potential range of nobler than 1 V (specifically the range of a potential equal to or nobler than 1 V and equal to or lower than 3 V with respect to lithium) or an aluminum alloy foil containing an element such as Mg, Ti, Zn, Mn, Fe, Cu, or Si. The thickness of the negative electrode collector 3a is preferably within the range of 8 μm to 25 μm and is more preferably within the range of 5 μm to 20 μm. In addition to the above foil, a stainless foil, a titanium foil, a copper foil, a nickel foil, or the like can be used as the negative electrode collector 4a. For example, when a negative electrode potential is nobler than 0.3 V with respect to metal lithium or a lithium—titanium oxide is used as the negative electrode active material, it is preferable to use the foregoing aluminum foil or aluminum alloy foil since the battery weight can be suppressed.

When the aforementioned aluminum foil is used as the negative electrode current collector 4a, the purity of the aluminum foil is preferably 99% or more.

When the aforementioned aluminum alloy foil is used as the negative electrode current collector 4a, it is preferable to suppress a content of a transition metal such as Fe, Cu, Ni or Cr to 1% by mass or less.

Herein, when a nonaqueous electrolyte battery 1 of the present embodiment is used for automobile use, the aluminum alloy foil is preferably used as the negative electrode current collector 4a.

The average crystal particle size of the aluminum foil or aluminum alloy foil used for the negative electrode current collector 4a is preferably 50 μm or less. Because the strength of the negative electrode current collector 4a can be increased by this average crystal particle size range, it is possible to densify the negative electrode with a high pressing pressure, and it is possible to increase the battery capacity. Also, because it is possible to prevent the dissolution and corrosion-induced deterioration of the negative electrode current collector in an over-discharging cycle under a high temperature condition (40° C. or higher), it is possible to suppress an increase in negative electrode impedance. Furthermore, it is possible to improve output characteristics, rapid charging, charging and discharging cycle characteristics.

In addition, the average crystal particle size is more preferably 30 μm or less, and much more preferably 5 μm or less.

The average crystal particle size can be obtained by the following calculation.

Firstly, the structure of the surface of a current collector is observed by an optical microscope, to thereby obtain the number (:n) of crystal particles within the region of 1 mm×1 mm.

Next, the average crystal particle area S is calculated using the aforementioned n and the equation $\{S=1\times10^6/n \ (\mu m^2)\}$.

Then, the average crystal particle size d (μm) can be calculated using the obtained value of S and the following equation (A).

$$d=2(S/\pi)^{1/2} \quad (A)$$

An aluminum foil or aluminum alloy foil having the average crystal particle size of 50 μm or less is complexly affected by multiple factors such as material compositions, impurities, processing conditions, thermal treatment history, and annealing conditions, and the aforementioned crystal particle size (diameter) is adjusted by the combination of various factors in the manufacturing process.

The negative electrode 4 can be produced, for example, by suspending the negative electrode active material, the conducting agent, and the binding agent in a general solvent to prepare a slurry, applying the slurry to the negative electrode current collector 4a and performing drying, and then performing pressing. The negative electrode 4 may be produced by forming the negative electrode active material, the conducting agent, and the binding agent in a pellet form to make the negative electrode layer 4b, and disposing and forming the negative electrode layer 4b on the negative electrode current collector 4a.

(3) Separator

Usable examples of the separator 5 include a porous film containing polyethylene, polypropylene, cellulose or polyvinylidene fluoride (PVdF), or a nonwoven fabric made of a synthetic resin. Examples of the porous film appropriately used for the separator 5 include a film made of polyethylene, polypropylene, or both thereof. The separator 5 formed of such a material is preferred because the separator 5 is melted when a battery temperature increases and reaches a certain temperature, which easily adds a shutdown function of blocking pores and considerably attenuating a charging and discharging current and improves safety of the nonaqueous electrolyte battery.

Also, in terms of reducing cost, it is possible to use the separator 5 formed of a cellulose-based material.

(4) Nonaqueous Electrolyte

Usable examples of the nonaqueous electrolyte include a liquid nonaqueous electrolyte prepared by dissolving a solute in an organic solvent or a gel-like nonaqueous electrolyte in which a liquid electrolyte and a polymer material are composited.

As the liquid nonaqueous electrolyte, it is desirable to use an electrolyte obtained by dissolving a solute in an organic solvent at a density equal to or greater than 0.5 mol/L and equal to or less than 2.5 mol/L.

Preferable examples of the solute include one or, two or more kinds of lithium salts selected from $LiBF_4$, $LiCF_3SO_3$, lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonimide [$LiN(CF_3SO_2)_2$], [$LiN(C_2F_5SO_2)_2$], [$Li(CF_3SO_2)_3C$], and $LiB[(OCO)_2]_2$. These lithium salts are dissolved in an organic solvent at a concentration within the range of 0.5 mol/L to 2 mol/L, to thereby prepare an organic electrolytic solution.

It is preferable that the solute be rarely oxidized at a high potential, and $LiPF_6$ is most preferred.

Examples of the organic solvent include cyclic carbonates such as propylene carbonate (PC), ethylene carbonate (EC), or vinylene carbonate, chain carbonates such as diethyl carbonate (DEC), dimethyl carbonate (DMC), and methylethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), and γ-butyrolactone (GBL), acetonitrile (AN), and sulfolane (SL). These organic solvents can be used solely or in a mixed solvent form.

Of the above examples, preferable examples of the organic solvent include mixed solvents obtained by mixing at least two solvents selected from the group of propylene carbonate (PC), ethylene carbonate (EC) and diethyl carbonate (DEC) or a mixed solvent containing γ-butyrolactone (GBL). By using these mixed solvents, it is possible to obtain a nonaqueous electrolyte battery having excellent high-temperature characteristics.

Examples of the polymer material forming the gel-like nonaqueous electrolyte include materials containing polyvinylidene fluoride (PVdF), polyacrylonitrile (PAN), and polyethylene oxide (PEO).

Also, as the nonaqueous electrolyte, a lithium ion-containing ambient temperature molten salt (ionic melt) can also be used. For example, when an ionic melt, which is formed of lithium ions, organic cations and anions and is a liquid at a temperature 100° C. or lower and preferably even at a temperature room temperature or lower, is selected as the nonaqueous electrolyte, it is possible to obtain the nonaqueous electrolyte battery with a broad range of operation temperatures.

(5) Battery Case

Examples of materials for the battery case 2 include stainless steel, nickel-plated stainless steel, and nickel-plated steel plate. Of these, stainless steel is preferable because it exhibits high strength, particularly tensile strength, compared with the case made of aluminum laminate film. When the battery case 2 formed of stainless steel members is employed in the nonaqueous electrolyte battery 1 according to the present embodiment, it is possible to increase the size as compared with a battery using a battery case made of an aluminum laminate film. Also, stainless steel is excellent in corrosion resistance, and therefore, when the battery case 2 formed of stainless steel members is employed in the nonaqueous electrolyte battery 1 according to the present embodiment, it is possible to improve the durability.

Also, it is preferable that the thickness of the battery case 2 be 0.2 mm or less.

(6) Terminal Part (Electrode Lead)

For the electrode lead that can be connected electrically to the positive electrode 3, i.e. the electrode lead 71, aluminum, titanium and the alloys based thereon can be used. Also, stainless steel can be used.

Also, for the electrode lead that can be connected electrically to the negative electrode 4, i.e. the electrode lead 72, nickel, copper and the alloys based thereon can be used.

When a negative electrode potential is nobler than 1 V with respect to metal lithium, e.g. when lithium titanates are used as the negative electrode active material, it is possible to use the aluminum or aluminum alloy for the material of the electrode lead 72. In this case, it is preferable that the aluminum or aluminum alloy be used for both of the electrode lead 71 and the electrode lead 72 in term of weight reduction and electrical resistance suppression to a small value.

In terms of mechanical characteristics, it is preferable that the electrode lead 71 and the electrode lead 72 do not have the much greater mechanical strength than the positive electrode current collector 3a or the negative electrode current collector 4a because it is possible to relax the stress concentration at the connected parts thereof. Ultrasonic welding is one of the preferable methods as the connection method between the electrode leads 71, 72 and the respective current collectors. When ultrasonic welding is used as the connection method, it is preferable that Young's modulus of the electrode lead 71 or electrode lead 72 be small because it is possible to easily carry out strong welding.

For example, pure aluminum (JIS1000 series) subjected to an annealing process is preferable as the material of the electrode lead 71 or electrode leads 72.

The thickness of the electrode lead 71 is preferably within a range of 0.1 to 1 mm, and more preferably a range of 0.2 to 0.5 mm.

The thickness of the electrode lead 72 is preferably within a range of 0.1 to 1 mm, and more preferably a range of 0.2 to 0.5 mm.

(7) Insulating Resin Layer

The insulating resin layer 8 is not particularly limited, but the insulating resin layer made of a thermoplastic resin is desirable, for example.

According to the present embodiment as described above, it is possible to provide the nonaqueous electrolyte battery 1 in which the amount of moisture penetration from the outside of the battery is small and the service life is long.

[Second Embodiment]

Hereinafter, the second embodiment will be described.

Figure 6:
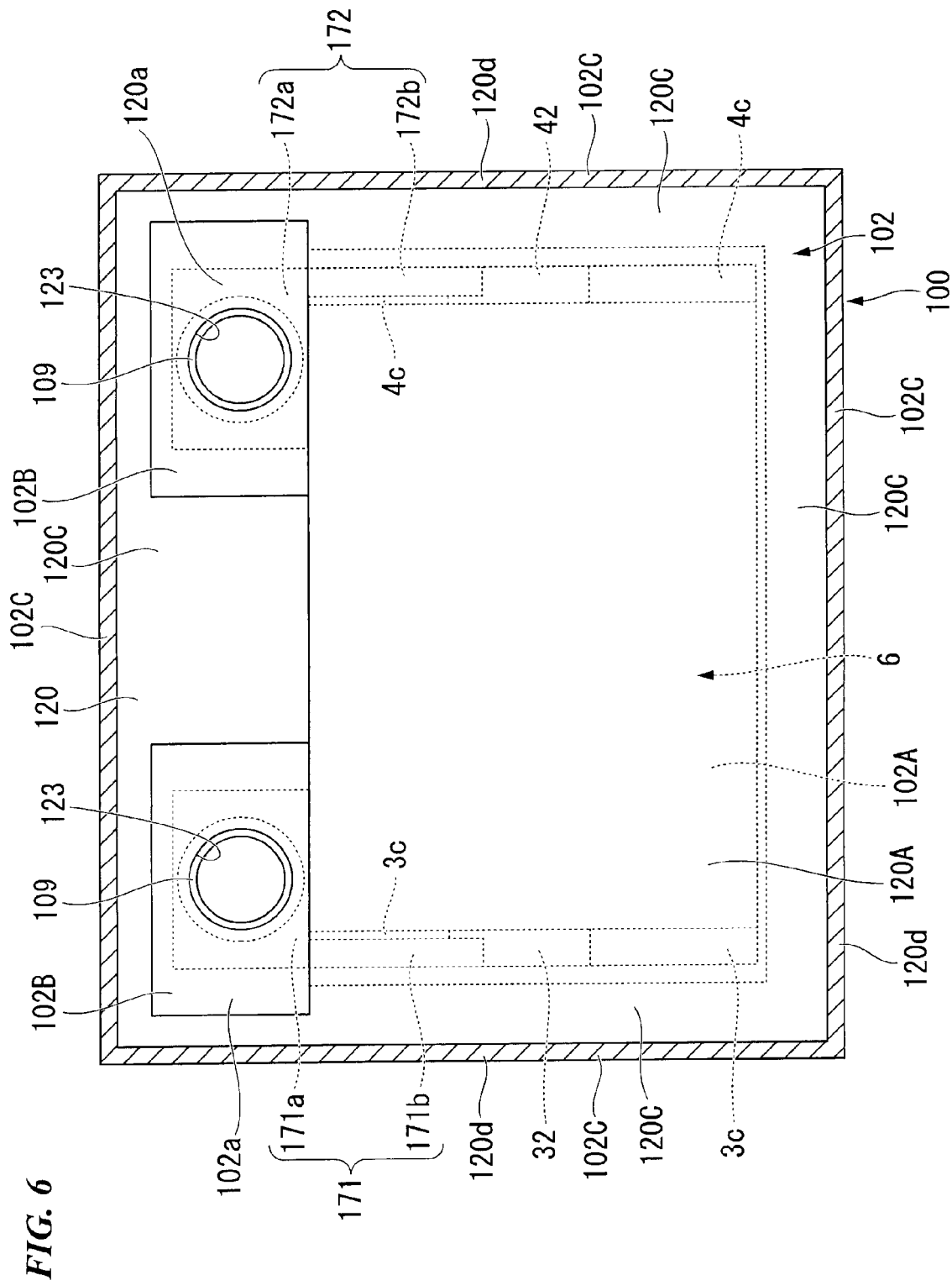
FIG. 6 is a schematic planar view illustrating a nonaqueous electrolyte battery according to the second embodiment.

FIG. 6 is a schematic external view illustrating the nonaqueous electrolyte battery 100 according to the second embodiment. In the following description, the same reference signs are put to the common constituent features described in the first embodiment with reference to FIG. 1 to FIG. 5C, and the detailed descriptions are omitted.

The description of the present embodiment with reference to the FIG. 6 shows a planar view which is illustrated from the side of the first casing unit 120 constituting the battery case 102 made of stainless steel, and there is the unillustrated second casing unit on the back side of the first casing unit 120. Therefore, in the following description, the constituent features of the unillustrated second casing unit will be explained with reference to FIG. 6 while omitting the reference signs.

In the nonaqueous electrolyte battery 100 of the second embodiment shown in FIG. 6, the through holes 123 are formed on the same side of the first casing unit 120 of the battery case 102 made of stainless steel. The nonaqueous electrolyte battery 100 is the same as the nonaqueous electrolyte battery 1 of the first embodiment except for the following (1) to (3).

(1) The battery case 102 includes four welded sealing parts 102C formed at the four ends. In other words, the electrode group-housing part 102A and the terminal-housing parts 102B of the battery case 102 are enclosed by welded sealing part 102C in a planar view. Accordingly, the battery case 102 does not include a folded part.

(2) The concave terminal-housing parts 102B provided in two places of the first casing unit 120 extend from the one peripheral side of the electrode group-housing part 102A of the first casing unit 120 toward the outside of the electrode group-housing part 102A in the same direction. The battery case 102 includes the first casing unit 120 in which the aforementioned terminal-housing parts 102B are provided in two places, and thus, includes the two fixing parts 120*a*, 120*a* which extend from the peripheral part of the electrode group-housing part 102A in the same direction. Also, the unillustrated second casing unit includes the two fixing parts in the corresponding places to those of the first casing unit.

(3) The electrode lead 171 and electrode lead 172 are not strip-shaped.

Hereinafter, the nonaqueous electrolyte battery 100 of the second embodiment will be described in details.

As shown in FIG. 6, the nonaqueous electrolyte battery 100 of the present embodiment is different from the nonaqueous electrolyte battery 1 of the first embodiment in that the fixing parts 120*a* and the terminal housing parts 102B are distantly placed at the positions along the same single side of the four sides defining the housing part 120A of the first casing unit 120 in the first casing unit 120 constituting the battery case 102. In the example shown in FIG. 6, the second casing unit is not illustrated. The configuration, in which the electrode lead 171 and electrode lead 172 are fixed by the fixing parts 120*a*, 120*a* in the nonaqueous electrolyte battery 100 of the present embodiment, is the same as that in the nonaqueous electrolyte battery 1 of the first embodiment shown in FIG. 5A, etc., and the detailed descriptions are omitted. Also, the configuration for the electric connection to the outside of the battery through the through hole 123 is the same as that in the nonaqueous electrolyte battery 1 of the first embodiment shown in FIG. 5A, etc., and the detailed descriptions are omitted.

The battery case 102 is formed by laminating the first casing unit 120 and the unillustrated second casing unit so as to face each other, subjecting the laminated parts to be welded (see reference sign 120*d* in FIG. 6) to seam welding, and integrating the first casing unit 120 and the second casing unit. Also, the electrode group-housing part 102A is configured by integrating the housing part 120A of the first casing unit 120 and the housing part of the unillustrated second casing unit, and the terminal-housing parts 102B are configured by integrating the fixing parts 120*a* of the first casing unit 120 and the fixing parts of the unillustrated second casing unit. Also, the through holes 123 provided in the first casing unit 120 become the through holes for exposing the electrode leads 171, 172 housed in the terminal-housing parts 102B. Moreover, the welded sealing part 102C, which seals the electrode group-housing part 102A and the terminal-housing parts 102B, is configured by welding the parts to be welded which are the outer peripheral parts of the first casing unit 120 and the second casing unit (see reference sign 120d in FIG. 6).

The electrode leads 171, 172 of the present embodiment include the main parts 171a, 172a having a rectangular planar shape and the stripe-shaped connection parts 171b, 172b that extends from the one long side of the four sides of the main parts 171a, 172a. As shown in FIG. 6, these electrode leads 171, 172 have a flag-type planar shape. The main part 171a of the electrode lead 171 and the main part 172a of the electrode lead 172 are housed in the terminal-housing parts 102B, 102B of the first casing unit 120.

On the other hand, as shown in FIG. 6, the portion including the end part of the connection part 171b of the electrode lead 171 is overlapped with the positive electrode current collector tab 32, and is connected electrically to the positive electrode current collector tab 32.

In the same manner, the portion including the end part of the connection part 172b of the electrode lead 172 is overlapped with the negative electrode current collector tab 42, and is connected electrically to the negative electrode current collector tab 42.

The fixing parts 120a, 120a of the battery case 102 (including the unillustrated fixing part of the second casing unit) clamp and fix the main part 171a, 172a of the electrode leads 171, 172. In the fixing parts 120a, 120a, the main parts 171a, 172a of the electrode leads 171, 172 are partially exposed to the outside through the through holes 123. In the same manner as the electrode leads 71, 72 in the nonaqueous electrolyte battery 1 of the first embodiment, the main parts 171a, 172a of the electrode leads 171, 172 include the unillustrated insulating resin layer formed of a thermoplastic resin, and have the configuration in which the battery case 102 and the electrode leads 171, 172 (171a, 172a) are insulated by the insulating resin layers. Also, the fixing methods among the battery case 102, the electrode leads 171, 172, and the insulating resin layer in the second embodiment can be the same as those in the first embodiment.

Moreover, the circular resin sealants 109 are provided in the terminal-housing parts 102B, 102B shown in FIG. 6 in the same manner as the nonaqueous electrolyte battery 1 of the first embodiment. As shown in FIG. 6, the resin sealants 109 are formed to cover the end surfaces of the through holes 123 provided in the fixing parts 120a of the first casing unit 120, the end surfaces of the through holes provided in the unillustrated insulating resin layers, the end parts of the boundary surfaces between the fixing parts 120a and the insulating resin layers, the portions of the main parts 171a, 172a of the electrode leads 171, 172, and the end parts of the boundary surface between the insulating resin layers and the main parts 171a, 172a of the electrode leads 171, 172. Also, the main parts 171a, 172a of the electrode leads 171, 172 are partially exposed on the insides of the circular resin sealants 109. In other words, the main parts 171a, 172a of the electrode leads 171, 172 are exposed to the outside through the circular resin sealants 109, the through holes of the unillustrated insulating resin layers and the through holes 123 of the fixing parts 120a. For this reason, the nonaqueous electrolyte battery 100 can obtain electrical conduction to the outside through the electrode leads 171, 172 (main parts 171a, 172a) exposed to the outside.

In the battery case 102 of the present embodiment, the first casing unit 120 and the second casing unit are welded to each other so as to form the welded sealing part 102C in the same manner as the battery case 2 of the first embodiment, and thus, the electrode group-housing part 102A is sealed from the external environment of the battery. However, moisture, etc. can penetrate from the external environment through the through holes 123 provided in the fixing parts 120a. In the present embodiment, in the same manner as the first embodiment, the formation of the circular resin sealants 109 seals the end parts of the boundary surfaces between the fixing parts 120a of the first casing unit 120 and the unillustrated insulating resin layers, and the end parts of the boundary surfaces between the electrode leads 171, 172 (main parts 171a, 172a) and the insulating resin layers. Accordingly, the electrode group-housing part 102A is completely sealed. Because including the resin sealants 109 in this manner, the nonaqueous electrolyte battery 100 of the present embodiment has the configuration in which moisture can be prevented from penetrating through the spaces between the electrode leads 171, 172 and the battery case 102.

In the same manner as the resin sealant 9 of the first embodiment, the resin sealant 109 of the present embodiment is formed of the resin composition having a coefficient of thermal expansion (linear expansion coefficient) within a range of 8 to 50 ($\times 10^{-6}$/K) at 0° C. to 100° C. By setting the coefficient of thermal expansion of the resin sealant 109 within a range of 8 to 50 ($\times 10^{-6}$/K), it is possible to relax the thermal stress due to temperature change during charging and discharging, which is caused by the difference in the coefficient of thermal expansion between the resin sealant 109 and the metallic member constituting the battery case 102. Also, it is possible to suppress the resin sealant 109 from cracking or breaking.

Moreover, when the unillustrated insulating resin layer formed of the aforementioned insulating material such as resins is interposed between the fixing parts 120a, 120a (including the unillustrated fixing part provided in the second casing unit) and the electrode leads 171, 172, the electrical contact between the battery case 102 and the electrode leads 171, 172 is prevented.

Also, in the welded sealing part 102C at the peripheral side of the electric case 102, all of the four sides are subjected to seam welding to be sealed. Thereby, the inside of the battery case 102 is kept airtightly.

Therefore, in the nonaqueous electrolyte battery 100 of the present embodiment, it is possible to significantly suppress moisture penetration from the outside of the battery and to prevent the battery from swelling. Also, it is possible to prevent the nonaqueous electrolyte from leaking to the outside, and thus, the nonaqueous electrolyte battery of the present embodiment is highly reliable.

Specifically, the nonaqueous electrolyte battery having the aforementioned configuration does not have the space between the fixing part 120a and the main part 171a of the electrode lead 171 and the space between the fixing part provided in the unillustrated second casing unit and the main part 172a of the electrode lead 172. Therefore, even if the moisture contained in the outside air penetrates the fixing parts 120a, 120a (including the unillustrated fixing part provided in the second casing unit) through the through holes 123, 123, the main part 171a of the electrode lead 171 and the fixing parts 120a clamping this main part, and the main part 172a of the electrode lead 172 and the unillustrated fixing parts clamping this main part can prevent the moisture from penetrating through the spaces therebetween.

Also, in the nonaqueous electrolyte battery 100 of the present embodiment, the through holes 123, 123 are provided in the fixing parts 120a as described above, but the peripheries of the through-holes 123, 123 are heat-sealed with the insulating resin layers (unillustrated) and the resin sealants 109 at the main part 171a of the electrode lead 171 and the main part 172a of the electrode lead 172. The heat-sealing is excellent in sealing property, and thus, it is possible to prevent moisture from penetrating into the fixing parts 120a (including the unillustrated fixing part provided in the second casing unit). Conclusively, it is possible to prevent the moisture contact of the electrode group 6 housed in the electrode group-housing part 102A of the battery case 102. Also, the heat-sealing, which show good sealing property as described above, can prevent the nonaqueous electrolyte housed in the electrode group-housing part 102A of the battery case 102 from leaking to the outside of the nonaqueous electrolyte battery 100.

Moreover, the welded sealing parts 102C, which is the four peripheral sides in the battery case 102 subjected to seam welding, can prevent moisture from penetrating into the inside of the battery case 102.

In this manner, the nonaqueous electrolyte battery 100 of the second embodiment shown in FIG. 6 can prevent the moisture contact of the electrode group 6, and thus, it is possible to prevent the deterioration of the electrode group 6 such as the expansion of the electrode group 6 for a long period. As a result, the nonaqueous electrolyte battery 100 of the second embodiment shown in FIG. 6 can achieve a long service life.

Moreover, in the nonaqueous electrolyte battery 100 of the second embodiment shown in FIG. 6, the main part 171a of the electrode lead 171 and the main part 172a of the electrode lead 172, which are connected electrically to the electrode group 6, are partially exposed to the outside through the through holes 123, 123 provided in the fixing parts 120a. For this reason, the nonaqueous electrolyte battery 100 of the present embodiment can easily and surely obtain the electrical conduction to the electronic devices and/or other batteries through the exposed parts.

[Third Embodiment]

Hereinafter, the third embodiment will be described.

Figure 7:
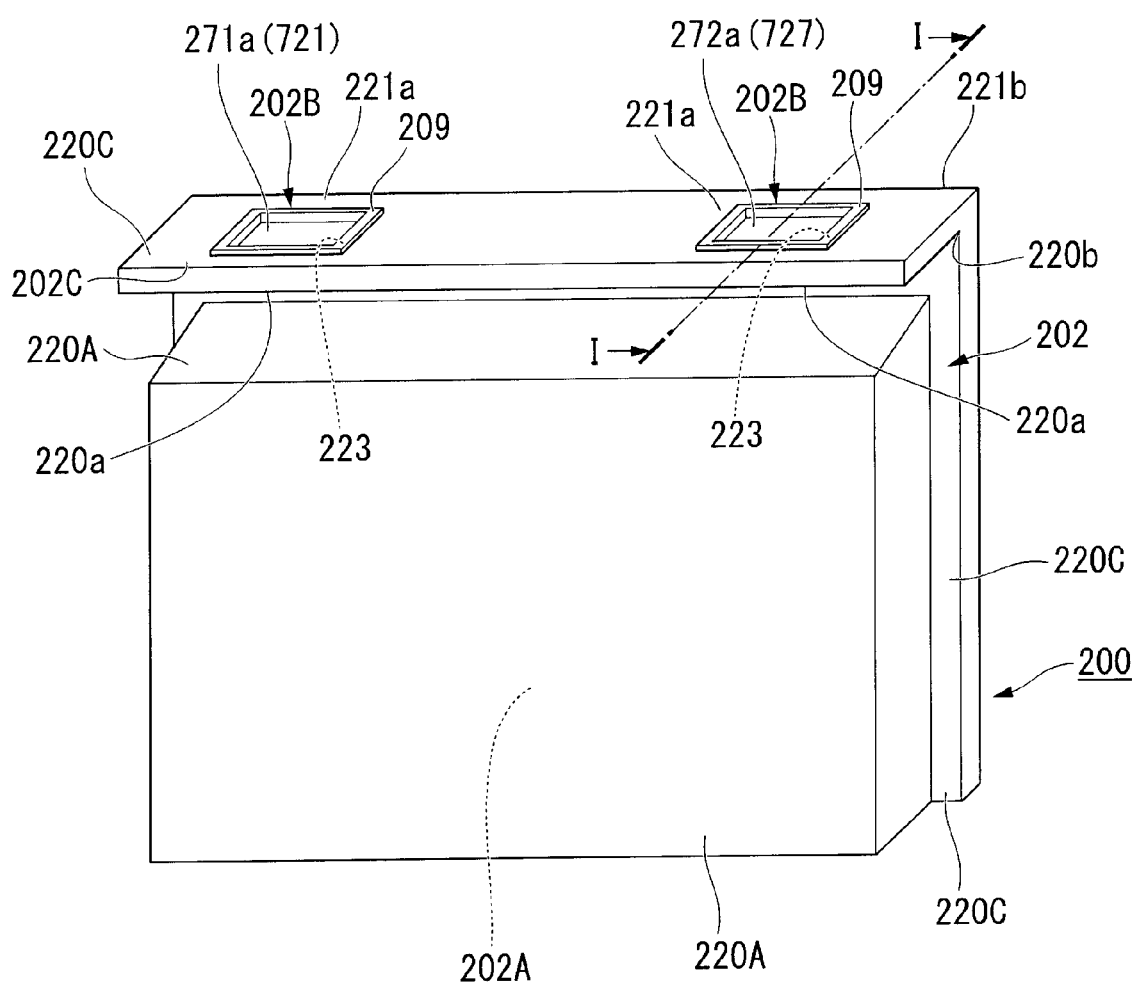
FIG. 7 is a perspective view illustrating a nonaqueous electrolyte battery according to the third embodiment.
Figure 8:
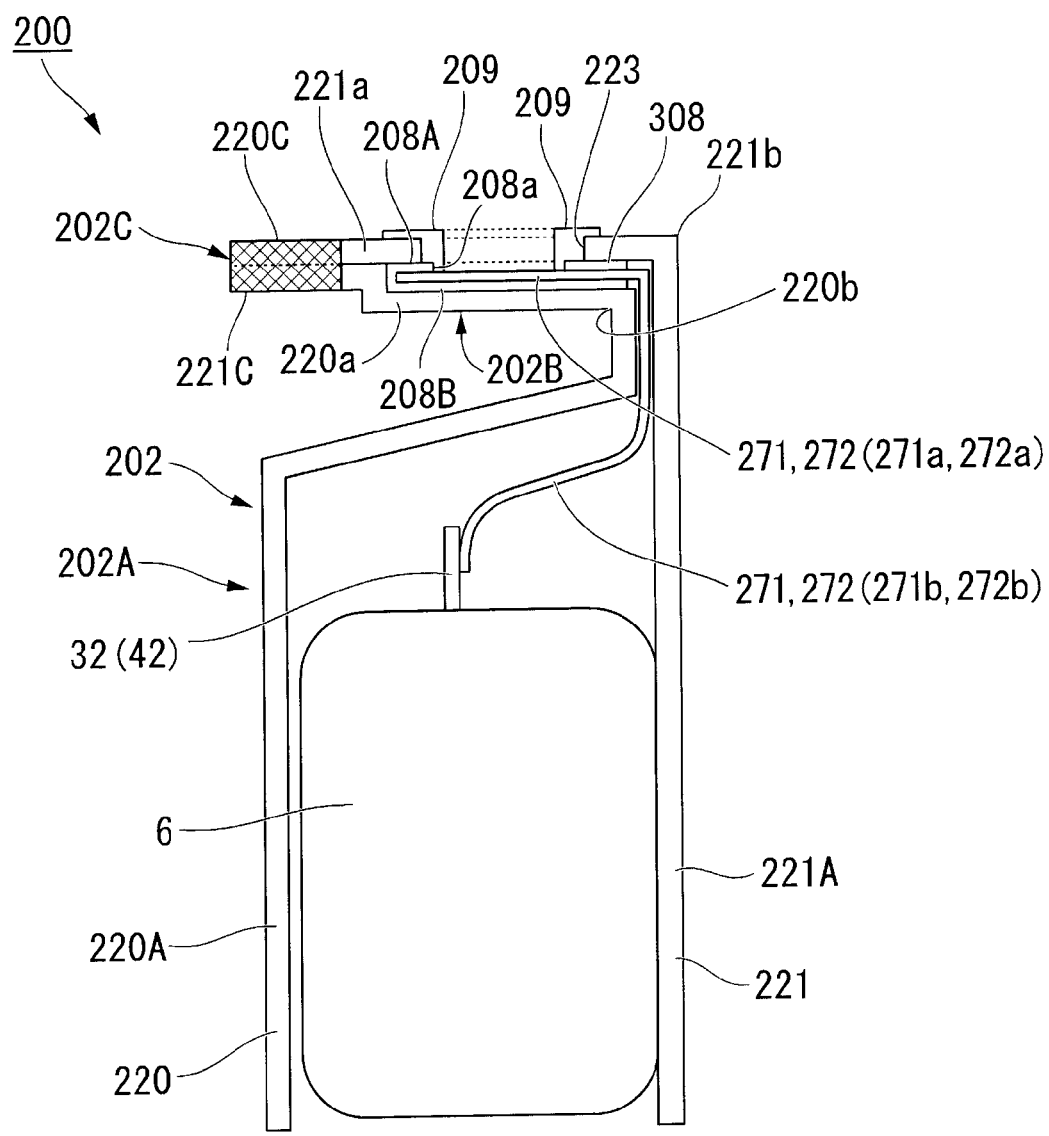
FIG. 8 is a schematic cross-sectional view illustrating a main part of a nonaqueous electrolyte battery according to the third embodiment.

FIG. 7 is a schematic external view illustrating the nonaqueous electrolyte battery 200 according to the third embodiment, and FIG. 8 is a schematic cross-sectional view illustrating the I-I cross-section shown in FIG. 7. This nonaqueous electrolyte battery 200 is configured such that the terminal-housing part 202B is bent toward the electrode group-housing part 202A.

In the following description, the same reference signs are put to the common constituent features described in the first embodiment with reference to FIG. 1 to FIG. 5C, and the detailed descriptions are omitted in the same manner as the description of the second embodiment.

The nonaqueous electrolyte battery 200 of the third embodiment shown in FIG. 7 and FIG. 8 includes the electrode group 6, the electrode lead 271 and the electrode lead 272. The electrode group 6, the electrode lead 271 and the electrode lead 272 are the same as the electrode group 6, the electrode lead 171 and the electrode lead 172 included in the nonaqueous electrolyte battery 100 of the second embodiment described with reference to FIG. 6. Although a detailed illustration is omitted, the portion including the end part of the connection part 271b of the electrode lead 271 is connected electrically to the positive electrode current collector tab 32 of the electrode group 6, and the portion including the end part of the connection part 272b of the electrode lead 272 is connected electrically to the negative electrode current collector tab 42 of the electrode group 6. In other words, the connection configuration among the electrode group 6, the electrode lead 271 and the electrode lead 272 in the nonaqueous electrolyte battery 200 of the present embodiment are the same as that in the nonaqueous electrolyte battery 100 of the second embodiment described with reference to FIG. 6, and a detailed illustration and description are omitted.

Also, the nonaqueous electrolyte battery 200 shown in FIG. 7 further includes the battery case 202.

The battery case 202 included in the nonaqueous electrolyte battery 200 shown in FIG. 7 and FIG. 8 is the same as the battery case 102 included in the nonaqueous electrolyte battery 100 of the second embodiment described with reference to FIG. 6 except for the following.

(A) The through hole is not provided in the first casing unit 220. Instead, in the nonaqueous electrolyte battery 200 shown in FIG. 7 and FIG. 8, the through holes 223, 223 having a rectangular planar shape (one of which is not illustrated in FIG. 8) are provided at the portion of the second casing unit 221 which has the surface facing the electrode group-housing part 202A of the first casing unit 220.

In the fixing parts 220a, 221a of the nonaqueous electrolyte battery 200 shown in FIG. 7 and FIG. 8, the main part 271a of the electrode lead 271 and the main part 272a of the electrode lead 272 are clamped by the first casing unit 220 and the second casing unit 221, and the main part 271a of the electrode lead 271 and the main part 272a of the electrode lead 272 are partially exposed through the through holes 223, 223.

(B) The fixing parts 220a, 221a of the battery case 202 include the bent parts 220b, 221b, respectively.

Specifically, the bent parts 220b, 221b are mountain-folded in the battery case 202 as shown in FIG. 7, and thus, the fixing part 220a extending from the electrode group-housing part 202A of the first casing unit 220 and the fixing part 221a extending from the electrode group-housing part 221A of the second casing unit 221 are respectively and partially arranged so as to face the electrode group-housing part 202A of the first casing unit 220. In this manner, the fixing parts 220a, 221a include the bent parts 220b, 221b formed by bending the battery case 202.

Hereinafter, the nonaqueous electrolyte battery 200 of the third embodiment will be described in more details.

In the nonaqueous electrolyte battery 200 of the third embodiment shown in FIG. 7 and FIG. 8, the fixing parts 220a, 221a respectively clamp the main part 271a of the electrode lead 271 and the main part 272a of the electrode lead 272 as described above. Also, in the same manner as the electrode leads 71, 72 of the nonaqueous electrolyte battery 1 of the first embodiment, the main parts 271a, 272a of the electrode leads 271, 272 are heat-sealed to the periphery of the through hole 223 through the thermoplastic resin layer 208 (208A, 208B) and the resin sealant 209. Moreover, in the same manner as the resin sealants 9, 109 of the first and second embodiments, the aforementioned resin sealant 209 is formed of the resin composition having a coefficient of thermal expansion within a range of 8 to 50 $(\times 10^{-6}/K)$ at 0° C. to 100° C.

The electrode leads 271, 272 include the main parts 271a, 272a having a rectangular planar shape and the stripe-shaped connection parts 271b, 272b that extends from the one long side of the four sides of the main parts 271a, 272a.

Although FIG. 7 and FIG. 8 do not have a detailed illustration, these electrode leads 271, 272 have a flag-type planar shape. The main part 271a of the electrode lead 271 and the main part 272a of the electrode lead 272 are housed in the terminal-housing parts 202B, 202B of the first casing unit 220. Also, the boundaries between the main parts 271a, 272a of the electrode leads 271, 272 and the connection parts 271b, 272b are respectively bent along the bent parts 220b, 221b of the battery case 202.

On the other hand, as shown in FIG. 8, the portion including the end part of the connection part 271b of the electrode lead 271 is overlapped with the positive electrode current collector tab 32, and is connected electrically to the positive electrode current collector tab 32.

In the same manner, the portion including the end part of the connection part 272b of the electrode lead 272 is overlapped with the negative electrode current collector tab 42, and is connected electrically to the negative electrode current collector tab 42.

The fixing parts 220a, 221a of the battery case 202 clamp and fix the main part 271a, 272a of the electrode leads 271, 272. In the fixing parts 220a, 221a, the main parts 271a, 272a of the electrode leads 271, 272 are partially exposed to the outside through the through holes 223. In the same manner as the electrode leads 71, 72 in the nonaqueous electrolyte battery 1 of the first embodiment, the main parts 271a, 272a of the electrode leads 271, 272 include the insulating resin layer 208 formed of a thermoplastic resin layer, and have the configuration in which the battery case 202 and the electrode leads 271, 272 (the main parts 271a, 272a) are insulated by the insulating resin layers. In the present embodiment, for example, the main parts 271a, 272a of the electrode leads 271, 272 can be bonded or heat-sealed to the fixing parts 220a, 221a through the insulating resin layers 208A, 208B interposed between the fixing parts 220a, 221 a and the main parts 271a, 272a of the electrode leads 271, 272, to thereby fix the main parts 271a, 272a of the electrode leads 271, 272 to the terminal-housing parts 202B, 202B. Alternatively, the main parts 271a, 272a of the electrode leads 271, 272 can be clamped to the fixing parts 220a, 221a through the insulating resin layers, to thereby fix the main parts 271a, 272a of the electrode leads 271, 272 to the terminal-housing parts 202B, 202B.

Moreover, the circular resin sealants 209 are provided in the terminal-housing parts 202B, 202B shown in FIG. 7 and FIG. 8 in the same manner as the nonaqueous electrolyte battery 1 of the first embodiment. As shown in FIG. 7 and FIG. 8, the resin sealants 209 are formed to cover the end surfaces of the through holes 223 provided in the fixing parts 221a of the second casing unit 221, the end surfaces of the through holes 208a provided in the insulating resin layers 208, the end parts of the boundary surfaces between the fixing parts 221a and the insulating resin layers 208, the portions of the main parts 271a, 272a of the electrode leads 271, 272, and the end parts of the boundary surface between the insulating resin layers and the main parts 271a, 272a of the electrode leads 271, 272. Also, the main parts 271a, 272a of the electrode leads 271, 272 are partially exposed on the insides of the circular resin sealants 209. In other words, the main parts 271a, 272a of the electrode leads 271, 272 are exposed to the outside through the circular resin sealants 209, the through holes 208a of the insulating resin layers 208 and the through holes 223 of the fixing parts 221a. For this reason, the nonaqueous electrolyte battery 200 can obtain electrical conduction to the outside through the electrode leads 271, 272 (main parts 271a, 272a) exposed to the outside.

In the battery case 202 of the present embodiment, the first casing unit 220 and the second casing unit 221 are welded to each other so as to form the welded sealing part 202C in the same manner as the battery case 102 of the second embodiment, and thus, the electrode group-housing part 202A is sealed from the external environment of the battery. However, moisture, etc. can penetrate from the external environment through the through holes 223 provided in the fixing parts 221a. In the present embodiment, in the same manner as the second embodiment, the formation of the circular resin sealants 209 seals the end parts of the boundary surfaces between the fixing parts 220a of the first casing unit 220 and the insulating resin layers 208B, and the end parts of the boundary surfaces between the electrode leads 271, 272 (main parts 271a, 272a) and the insulating resin layers 208A. Accordingly, the electrode group-housing part 202A is completely sealed. Because including the resin sealants 209 in this manner, the nonaqueous electrolyte battery 200 of the present embodiment has the configuration in which moisture can be prevented from penetrating through the spaces between the electrode leads 271, 272 and the battery case 202.

In the same manner as the resin sealants 9, 109 of the first and second embodiments, the resin sealant 209 of the present embodiment is formed of the resin composition having a coefficient of thermal expansion (linear expansion coefficient) within a range of 8 to 50 ($\times 10^{-6}$/K) at 0° C. to 100° C. By setting the coefficient of thermal expansion of the resin sealant 209 within a range of 8 to 50 ($\times 10^{-6}$/K), the coefficient of thermal expansion of the resin sealant becomes close to that of the metallic case. Also, it is possible to relax the thermal stress due to temperature change during charging and discharging, which is caused by the difference in the coefficient of thermal expansion between the resin sealant 209 and the metallic member constituting the battery case 202. Also, it is possible to suppress the resin sealant 209 from cracking or breaking.

Moreover, when the insulating resin layer 208 formed of the aforementioned insulating material such as resins is interposed between the fixing parts 220a, 221 a and the electrode leads 271, 272, the electrical contact between the battery case 202 and the electrode leads 271, 272 is prevented.

Also, in the welded sealing part 202C at the peripheral side of the electric case 202, all of the four sides are subjected to seam welding to be sealed. Thereby, the inside of the battery case 202 is kept airtightly.

Therefore, in the nonaqueous electrolyte battery 200 of the present embodiment, it is possible to significantly suppress moisture penetration from the outside of the battery and to prevent the battery from swelling. Also, it is possible to prevent the nonaqueous electrolyte from leaking to the outside, and thus, the nonaqueous electrolyte battery of the present embodiment is highly reliable.

More specifically, the nonaqueous electrolyte battery 200 of the present embodiment having the aforementioned configuration does not have the space between the fixing part 220a and the main part 271a of the electrode lead 271 and the space between the fixing part 221a and the main part 272a of the electrode lead 272. Therefore, even if the moisture contained in the outside air penetrates the fixing parts 220a, 221 a through the through holes 223, 223, the main part 271a of the electrode lead 271 and the fixing parts 220a, 221a clamping this main part, and the main part 272a of the electrode lead 272 and the fixing parts 220a, 221a clamping this main part can prevent the moisture from penetrating through the spaces therebetween.

Also, in the nonaqueous electrolyte battery 200 of the third embodiment, the through holes 223, 223 are provided in the fixing parts 221a as described above, but the peripheries of the through-holes 223, 223 are heat-sealed with the insulating resin layers 208 and the resin sealants 209 at the main part 271a of the electrode lead 271 and the main part 272a of the electrode lead 272. The heat-sealing is excellent in sealing property, and thus, it is possible to prevent moisture from penetrating into the fixing parts 220a, 221a. Conclusively, it is possible to prevent the moisture contact of the electrode group 6 housed in the electrode group-housing part 202A of the battery case 202. Also, the heat-sealing, which show good sealing property as described above, can prevent the nonaqueous electrolyte housed in the electrode group-housing part 202A of the battery case 202 from leaking to the outside of the nonaqueous electrolyte battery 200.

Moreover, the welded sealing parts 202C, which is the four peripheral sides in the battery case 202 subjected to seam welding, can prevent moisture from penetrating into the inside of the battery case 202.

In this manner, the nonaqueous electrolyte battery 200 of the third embodiment can prevent the moisture contact of the electrode group 6, and thus, it is possible to prevent the deterioration of the electrode group 6 such as the expansion of the electrode group 6 for a long period. As a result, the nonaqueous electrolyte battery 200 of the third embodiment shown in FIG. 7 and FIG. 8 can achieve a long service life.

Also, because the welded sealing parts 202C, which is the four peripheral sides in the battery case 202 subjected to seam welding, can prevent moisture from penetrating into the inside of the battery case 202, the nonaqueous electrolyte battery 200 of the third embodiment can achieve a long service life.

Moreover, in the nonaqueous electrolyte battery 200 of the third embodiment, the main part 271a of the electrode lead 271 and the main part 272a of the electrode lead 272, which are connected electrically to the electrode group 6, are partially exposed to the outside through the through holes 223, 223 provided in the fixing parts 221a. For this reason, the nonaqueous electrolyte battery 200 of the present embodiment can easily and surely obtain the electrical conduction to the electronic devices and/or other batteries through the exposed parts.

In the nonaqueous electrolyte battery 200 of the third embodiment, the exposed part through the through holes 223, 223 of the electrode leads 271, 272 is bent in the direction which does not face the electrode group-housing part 202A of the battery case 202. The battery case 202 used in the nonaqueous electrolyte battery 200 of the third embodiment is excellent in mechanical strength, and thus, can be bent in the aforementioned direction and can keep this shape. This configuration is preferred because the batteries are easily connected to each other when the plural nonaqueous electrolyte batteries 200 of the present embodiment are combined to prepare a battery pack.

According to the nonaqueous electrolyte battery 200 of the present embodiment as described above, the battery case 202 includes the electrode group-housing part 202A, the welded sealing part 202C formed at the end part, the fixing parts 220a, 221a interposed between the electrode group-housing part 202A and the welded sealing part 202C. The electrode lead 271 and the electrode lead 272 are respectively clamped by the fixing parts 220a, 221a, and the electrode leads are partially exposed through the through holes 223, 223 provided in the fixing parts 220a.

For this reason, the nonaqueous electrolyte battery 200 can prevent the moisture contact of the electrode group 6 housed in the battery case 202, and conclusively, can prevent the deterioration of the nonaqueous electrolyte battery 200. Therefore, this nonaqueous electrolyte battery 200 can achieve a long service life. Moreover, the nonaqueous electrolyte battery 200 of the third embodiment can easily and surely obtain the electrical conduction to the electronic devices and/or other batteries through the parts, which are exposed through the through holes 223, 223 of the fixing parts 220a, of the electrode leads 271, 272.

[Fourth Embodiment]

Hereinafter, the fourth embodiment will be described with reference to FIG. 9 and FIG. 10.

In the following description, the same reference signs are put to the common constituent features of the nonaqueous electrolyte battery 1 described in the first embodiment with reference to FIG. 1 to FIG. 5C, and the detailed descriptions are omitted. Also, the constituent features which are unillustrated in FIG. 9 and FIG. 10 may be appropriately described with reference to the reference signs shown in FIG. 1 to FIG. 5C.

The battery pack of the present embodiment employs the configuration in which the plural nonaqueous electrolyte batteries are connected to each other through the bus bar welded to the lead part of the nonaqueous electrolyte battery. In other words, in order to achieve large capacity and high output, it is preferable that the battery pack be formed by connecting the unit cells of the nonaqueous electrolyte battery in series or in parallel.

Figure 9:
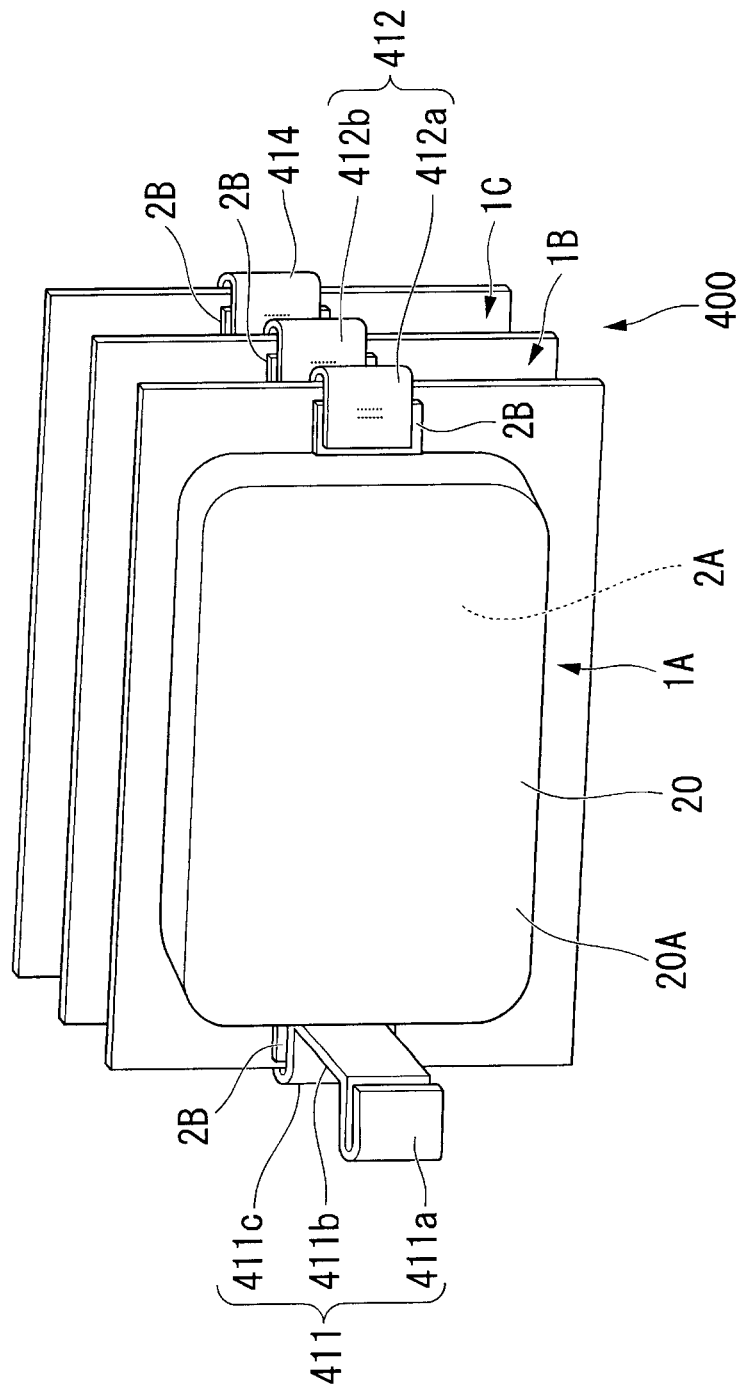
FIG. 9 is a perspective view illustrating a battery pack according to the fourth embodiment.
Figure 10:
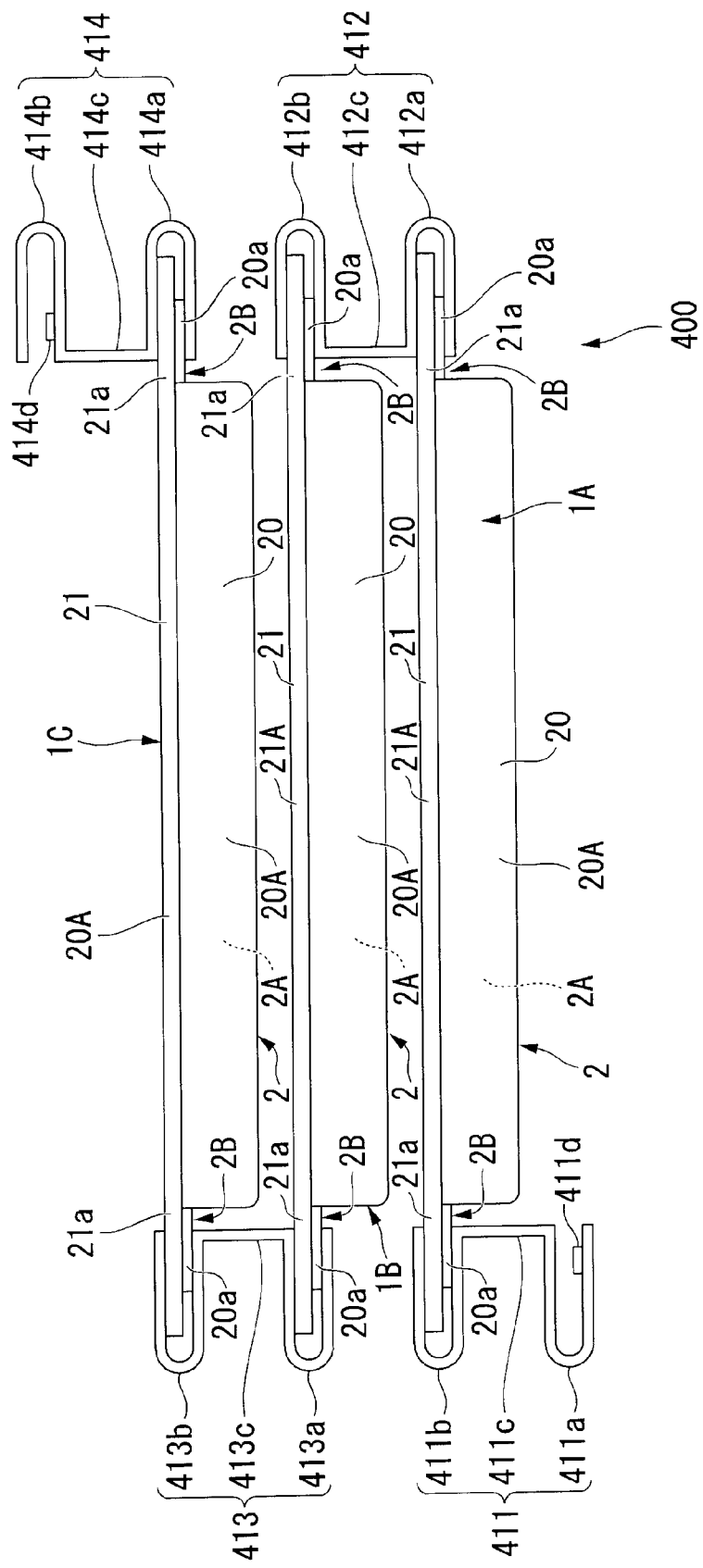
FIG. 10 is a side view illustrating a battery pack according to the fourth embodiment.

FIG. 9 and FIG. 10 are schematic external views illustrating the battery pack 400 according to the fourth embodiment.

This battery pack 400 includes the plural nonaqueous electrolyte batteries 1 of the first embodiment described above, and further includes the bus bars 411, 412 that electrically connect the electrode leads 71 or the electrode leads 72 of the plural nonaqueous electrolyte batteries 1. These bus bars 411, 412 are connected to the electrode leads 71 or the electrode leads 72 exposed through the through holes 23, 23 of the terminal-housing parts 2B of the plural nonaqueous electrolyte batteries 1.

As shown in FIG. 9 and FIG. 10, the first to third nonaqueous electrolyte batteries 1A to 1C are arranged such that the electrode group-housing part 2A of the first casing unit 20 of the second nonaqueous electrolyte battery 1B faces a portion (the extending part 21C) of the second casing unit 21 of the first nonaqueous electrolyte battery 1A and that the electrode group-housing part 2A of the first casing unit 20 of the third nonaqueous electrolyte battery 1C faces a portion (the extending part 21C) of the second casing unit 21 of the second nonaqueous electrolyte battery 1B. Also, as shown in FIG. 9 and FIG. 10, the first to third nonaqueous electrolyte batteries 1A to 1C are arranged such that the fixing parts 20a, 21a of the first nonaqueous electrolyte battery 1A face the fixing parts 20a, 21a of the second nonaqueous electrolyte battery 1B and the fixing parts 20a, 21a of the third nonaqueous electrolyte battery 1C.

The battery pack 400 shown in FIG. 9 and FIG. 10 further includes the four bus bars 411-414.

The first to fourth bus bars 411-414 are respectively the metallic member, and have electric conductivity.

As shown in FIG. 9 and FIG. 10, the first bus bar 411 includes the first clamping part 411a, the second clamping part 411b, and the connection part 411c that connects the first clamping part 411a and the second clamping part 411b.

The first clamping part 411a includes the two metallic plates facing each other, and the protrusion 411d is provided on one metallic plate. The first clamping 411a can be easily connected to the external terminal (unillustrated) of the electronic devices and/or other batteries through the protrusion 411d. Moreover, the protrusion 411d can prevent the disconnection of the first clamping part 411a and the external terminal of the electronic devices and/or other batteries.

In the same manner, the second clamping part 411b includes the two metallic plates, and the protrusion (unillustrated) is provided on one metallic plate.

In the same manner as the first bus bar 411, the second bus bar 412, the third bus bar 413 and the fourth bus bar 414 respectively include the first clamping parts 412a, 413a, 414a, the second clamping parts 412b, 413b, 414b, and the connection parts 412c, 413c, 414c that respectively connect the first clamping part 412a, 413a, 414a and the second clamping parts 412b, 413b, 414b. Also, the first clamping parts 412a, 413a, 414a and the second clamping parts 412b, 413b, 414b of the second to fourth bus bars 412-414 respectively include the two metallic plates facing each other in the same manner as the first clamping part 411a and the second clamping part 411b of the first bus bar 411, and the protrusion is provided on one metallic plate, respectively. Herein, the protrusions are not illustrated in the figure except for the protrusion 411d provided on the first clamping part 411a of the first bus bar 411 and the protrusion 414d provided on the second clamping part 414b of the fourth bus bar 414.

As shown in FIG. 9 and FIG. 10, the two metallic plates of the second clamping part 411b of the first bus bar 411 clamp the fixing parts 20a, 21a of the first nonaqueous electrolyte battery 1A. Herein, the unillustrated insulating resin layers are interposed between the two metallic plates of the second clamping part 411b and the fixing parts 20a, 21a. Therefore, the first bus bar 411 is insulated from the fixing parts 20a, 21a of the first nonaqueous electrolyte battery 1A.

Also, as shown in FIG. 9 and FIG. 10, the two metallic plates of the first clamping part 412a of the second bus bar 412 clamp the fixing parts 20a, 21a of the first nonaqueous electrolyte battery 1A in the configuration where the unillustrated insulating resin layers are respectively interposed between the metallic plates and the fixing parts 20a, 21a. In the same manner, the two metallic plates of the second clamping part 412b of the second bus bar 412 clamp the fixing parts 20a, 21a of the second nonaqueous electrolyte battery 1B in the configuration where the unillustrated insulating resin layers are respectively interposed between the metallic plates and the fixing parts 20a, 21a.

Also, as shown in FIG. 9 and FIG. 10, the first clamping part 413a of the third bus bar 413 clamp the fixing parts 20a, 21a of the second nonaqueous electrolyte battery 1B in the configuration where the unillustrated insulating resin layers are interposed between the metallic plates and the fixing parts 20a, 21a. In the same manner, the second clamping part 413b of the third bus bar 413 clamp the fixing parts 20a, 21a of the third nonaqueous electrolyte battery 1C in the configuration where the unillustrated insulating resin layers are respectively interposed between the metallic plates and the fixing parts 20a, 21a.

Also, as shown in FIG. 9 and FIG. 10, the first clamping part 414a of the fourth bus bar 414 clamp the fixing parts 20a, 21a of the third nonaqueous electrolyte battery 1C in the configuration where the unillustrated insulating resin layers are interposed between the metallic plates and the fixing parts 20a, 21a.

The respective protrusions, which are provided on one clamping parts of the first to fourth bus bars 411-414, are set on the through holes 23, 23 provided in the fixing part 20a of the first to third nonaqueous electrolyte batteries 1A to 1C.

Although a detailed illustration is omitted, for example, the unillustrated protrusion, which is provided on one metallic plate of the first clamping part 412a of the second bus bar 412, is set on the through hole 23 provided in the fixing part 20a of the first nonaqueous electrolyte battery 1A, and is welded to the electrode lead 72 clamped by the fixing parts 20a, 21a. For this reason, the second bus bar 412 is connected electrically to the electrode lead 72 of the first nonaqueous electrolyte battery 1A.

Although a detailed illustration is omitted, the other protrusions, which are provided on the first to fourth bus bars 411-414, are the same as the protrusion provided on the first clamping part 412a of the second bus bar 412. In other words, the protrusion, which is provided on the second clamping part 411b of the first bus bar 411, is set on the through hole provided in the fixing part 20a of the first nonaqueous electrolyte battery 1A, and is welded to the electrode lead clamped by the fixing parts 20a, 21a. For this reason, the first bus bar 411 is connected electrically to the electrode lead 71 of the first nonaqueous electrolyte battery 1A. The protrusion, which is provided on the second clamping part 412b of the second bus bar 412, is set on the through hole 23 provided in the fixing part 20a of the second nonaqueous electrolyte battery 1B, and is welded to the electrode lead 71 clamped by the fixing parts 20a, 21a. For this reason, the second bus bar 412 is connected electrically to the electrode lead 71 of the second nonaqueous electrolyte battery 1B. The protrusion, which is provided on the first clamping part 413a of the third bus bar 413, is set on the through hole 23 provided in the fixing part 20a of the second nonaqueous electrolyte battery 1B, and is welded to the electrode lead 72 clamped by the fixing parts 20a, 21a. For this reason, the third bus bar 413 is connected electrically to the electrode lead 72 of the second nonaqueous electrolyte battery 1B. The protrusion, which is provided on the second clamping part 413b of the third bus bar 413, is set on the through hole 23 provided in the fixing part 20a of the third nonaqueous electrolyte battery 1C, and is welded to the electrode lead 71 clamped by the fixing parts 20a, 21a. For this reason, the third bus bar 413 is connected electrically to the electrode lead 71 of the third nonaqueous electrolyte battery 1C. The protrusion, which is provided on the first clamping part 414a of the fourth bus bar 414, is set on the through hole 23 provided in the fixing part 20a of the third nonaqueous electrolyte battery 1C, and is welded to the electrode lead 72 clamped by the fixing parts 20a, 21a. Therefore, the fourth bus bar 414 is connected electrically to the electrode lead 72 of the third nonaqueous electrolyte battery 1C.

In the same manner as the first bus bar 411, the protrusion 414d is provided on the second clamping part 414b of the fourth bus bar 414 as shown in FIG. 10. The second clamping 414b of the fourth bus bar 414 can be easily connected to the external terminal of the electronic devices and/or other batteries through the protrusion 414d. Moreover, the protrusion 414d can prevent the disconnection of the fourth bus bar 414 and the external terminal of the electronic devices and/or other batteries.

In this manner, in the battery pack 400 of the present embodiment shown in FIG. 9 and FIG. 10, the first to third nonaqueous electrolyte batteries 1A to 1C are electrically connected in series through the second bus bar 412 and the third bus bar 413. Also, the battery pack 400 shown in FIG. 9 and FIG. 10 can achieve the electrical conduction to the electronic devices and/or other batteries through the first clamping part 411a of the first bus bar 411 and the second clamping part 414b of the fourth bus bar 414.

As described above with reference to FIG. 1 to FIG. 5C, the first to third nonaqueous electrolyte battery 1A to 1C are the electrolyte battery in which the amount of moisture penetration from the outside of the battery is small and the service life is long.

Therefore, in the battery pack 400 shown in FIG. 9 and FIG. 10, it is possible to achieve the advantageous characteristics in that the amount of moisture penetration from the outside of the battery is small and the service life is long.

[Fifth Embodiment]

Hereinafter, the fifth embodiment will be described with reference to FIG. 11.

In the following description, the same reference signs are put to the common constituent features of the nonaqueous electrolyte battery 1 described in the first embodiment with reference to FIG. 1 to FIG. 5C and the nonaqueous electrolyte battery 100 described in the second embodiment with reference to FIG. 6, and the detailed descriptions are omitted. Also, the constituent features which are unillustrated in FIG. 11 may be appropriately described with reference to the reference signs shown in FIG. 1 to FIG. 5C.

Figure 11:
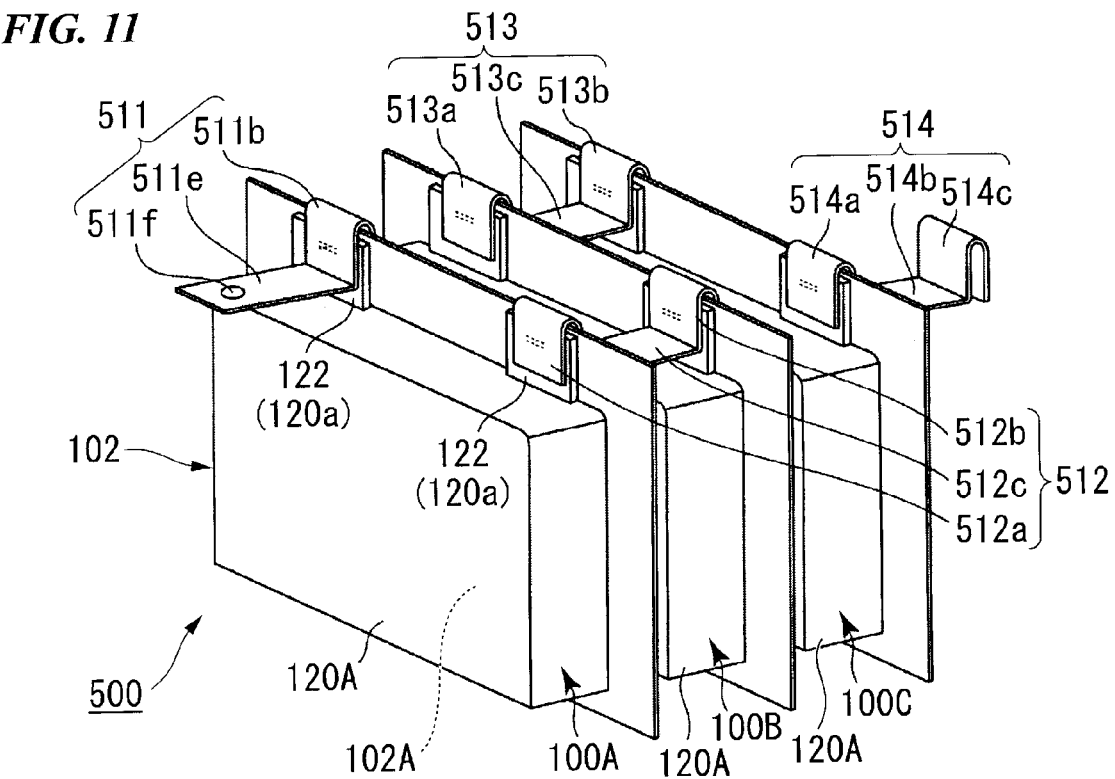
FIG. 11 is a perspective view illustrating a battery pack according to the fifth embodiment.

FIG. 11 is a perspective view illustrating the battery pack 500 according to the fifth embodiment. The battery pack 500 shown in FIG. 11 includes the three nonaqueous electrolyte batteries 100A, 100B, 100C.

The first nonaqueous electrolyte battery 100A and the third nonaqueous electrolyte battery 100C are respectively the nonaqueous electrolyte battery according to the second embodiment described with reference to FIG. 6. Also, the second nonaqueous electrolyte battery 100B has the same structure as the nonaqueous electrolyte battery 100 according to the second embodiment except that the positions of the electrode leads 171, 172 are reversed.

As shown in FIG. 11, in the first to third nonaqueous electrolyte batteries 100A, 100B, 100C are arranged such that the fixing parts 120a, 120a of the first nonaqueous electrolyte battery 100A are positioned so as to correspond to the fixing parts 120a, 120a of the second nonaqueous electrolyte battery 100B and the fixing parts 120a, 120a of the third nonaqueous electrolyte battery 100C.

The battery pack 500 shown in FIG. 11 further includes the four bus bars 511-514.

The first bus bar 511 includes the clamping part 511b and the external connection terminal 511e at the clamping part 511b.

The clamping part 511b includes the two metallic plates, and the unillustrated protrusion is provided on one of the two metallic plates of the clamping part 511b.

As shown in FIG. 11, the clamping part 511b clamps the fixing part 120a provided in the first casing unit 120 constituting the battery case 102 of the first nonaqueous electrolyte battery 100A (including the unillustrated fixing part provided in the second casing unit). In more details, the two metallic plates of the clamping part 511b clamp the respective fixing parts (see reference symbol 120a) of the first nonaqueous electrolyte battery 100A from the both sides. Herein, the unillustrated insulating resin layers are interposed between the respective metallic plates and fixing parts. Also, the protrusion, which is provided on one metallic plate of the clamping part 511b, is set on the through hole 123 provided in the fixing part 120a of the first nonaqueous electrolyte battery 100A, and is welded to the main part 171a of the electrode lead 171 clamped by the fixing part 120a, etc. For this reason, the first bus bar 511 is connected electrically to the main part 171a of the electrode lead 171 of the first nonaqueous electrolyte battery 100A.

The through hole 511f is formed in the external connection terminal 511e of the first bus bar 511. The external connection terminal 511e can be easily and rigidly connected to the external terminal of the electronic devices and/or other batteries by the screw clamp using the through hole 511f, for example.

The second bus bar 512 includes the first clamping part 512a, the second clamping part 512b, and the connection part 512c that connects the first clamping part 512a and the second clamping part 512b. The third bus bar 513 includes the first clamping part 513a, the second clamping part 513b, and the connection part 513c that connects the first clamping part 513a and the second clamping part 513b. The first clamping part 512a and the second clamping part 512b of the second bus bar 512, and the first clamping part 513a and the second clamping part 513b of the second bus bar 513 respectively include the two metallic plates facing each other, and the unillustrated protrusion is provided on one metallic plate, respectively. In other words, these clamping parts have the same structure as the clamping part 511b of the first bus bar 511.

As shown in FIG. 11, in the second bus bar 512, the first clamping part 512a clamps the fixing part (see reference symbol 120a) provided in the first casing unit 120 constituting the battery case 102 of the first nonaqueous electrolyte battery 100A from the both sides, and the second clamping part 512b clamps the fixing part 120a of the second nonaqueous electrolyte battery 100B, etc. Also, in the third bus bar 513, the first clamping part 513a clamps the fixing part (see reference symbol 120a) provided of the second nonaqueous electrolyte battery 100B, and the second clamping part 513b clamps the fixing part (see reference symbol 120a) of the third nonaqueous electrolyte battery 100C.

Although a detailed illustration is omitted, the protrusions, which are respectively provided on one metallic plates of the clamping parts of the second and third bus bars 512 and 513, are set on the through holes 123 provided in the fixing parts 120a of the first to third nonaqueous electrolyte batteries 100A, 100B, 100C in the same manner as the protrusion of the clamping part 511b of the first bus bar 511, and are respectively welded to the main parts 171a of the electrode leads 171, 172 or the main parts 172a of the electrode leads 172 clamped by the fixing parts 120a (including the unillustrated fixing part provided in the second casing unit). Because of these structures, the first to third nonaqueous electrolyte batteries 100A, 100B, 100C are electrically connected in series through the second bus bar 512 and the third bus bar 513.

As shown in FIG. 11, the fourth bus bar 514 includes the first clamping part 514a, the second clamping part 514b, and the connection part 514c that connects the first clamping part 514a and the second clamping part 514b in the same manner as the second bus bar 512 and the third bus bar 513. The first clamping part 514a and the second clamping part 514b of the fourth bus bar 514 respectively include the two metallic plates facing each other, and the unillustrated protrusion is provided on one metallic plate, respectively.

The first clamping part 514a of the fourth bus bar 514 clamps the fixing part 120a of the third nonaqueous electrolyte battery 100C (including the unillustrated fixing part provided in the second casing unit). Although a detailed illustration is omitted, the protrusion, which is provided on one metallic plate, is set on the through hole 123 provided in the fixing part 120a of the third nonaqueous electrolyte battery 100C in the same manner as the protrusion of the clamping part 511b of the first bus bar 511, and is welded to the main part 172a of the electrode lead 172 clamped by the respective fixing parts (see reference sign 120a). For this reason, the fourth bus bar 514 is connected electrically to the electrode lead 172 of the third nonaqueous electrolyte battery 100C.

The second clamping 514b of the fourth bus bar 514 can be easily connected to the external terminal of the electronic devices and/or other batteries through the unillustrated protrusion, for example. Moreover, this protrusion can prevent the disconnection of the fourth bus bar 514 and the external terminal of the electronic devices and/or other batteries.

As described above with reference to FIG. 1 to FIG. 5C, the first to third nonaqueous electrolyte battery 100A, 100B, 100C are the electrolyte battery in which the amount of moisture penetration from the outside of the battery is small and the service life is long.

Therefore, in the battery pack 500 shown in FIG. 11, it is possible to achieve the advantageous characteristics in that the amount of moisture penetration from the outside of the battery is small and the service life is long.

Also, the first to third nonaqueous electrolyte batteries 100A, 100B, 100C can easily and surely achieve the electrical conduction to the electronic devices and/or other batteries through the external connection terminal 511e of the first bus bar 511 and the second clamping part 514b of the fourth bus bar 514.

According to the fifth embodiment, the battery pack 500 having the aforementioned configuration can be provided. This battery pack includes the plural nonaqueous electrolyte batteries 100 of the second embodiments. Therefore, the battery pack of the fifth embodiment can easily and surely achieve the electrical conduction to the electronic devices and/or other batteries, and can achieve the advantageous characteristics in that the amount of moisture penetration from the outside of the battery is small and the service life is long.

[Sixth Embodiment]

Hereinafter, the sixth embodiment will be described with reference to FIG. 12.

In the following description, the same reference signs are put to the common constituent features of the nonaqueous electrolyte battery 1 described in the first embodiment with reference to FIG. 1 to FIG. 5C and the nonaqueous electrolyte battery 200 described in the third embodiment with reference to FIG. 7 and FIG. 8, and the detailed descriptions are omitted. Also, the constituent features which are unillustrated in FIG. 12 may be appropriately described with reference to the reference signs shown in FIG. 1 to FIG. 5C, FIG. 7 and FIG. 8, etc.

Next, the battery pack 600 of the sixth embodiment will be described with reference to FIG. 12.

Figure 12:
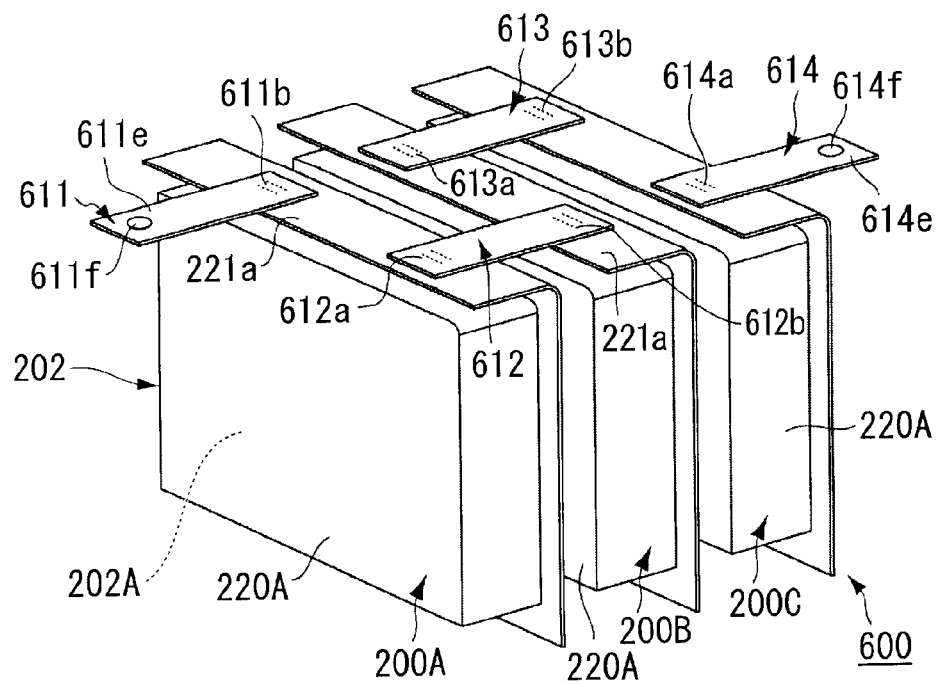
FIG. 12 is a perspective view illustrating a battery pack according to the sixth embodiment.

FIG. 12 is a perspective view illustrating the battery pack 600 according to the sixth embodiment. The battery pack 600 shown in FIG. 12 includes the three nonaqueous electrolyte batteries 200A, 200B, 200C.

The first nonaqueous electrolyte battery 200A and the third nonaqueous electrolyte battery 200C are respectively the nonaqueous electrolyte battery according to the third embodiment described with reference to FIG. 7 and FIG. 8. Also, the second nonaqueous electrolyte battery 200B has the same structure as the nonaqueous electrolyte battery 200 according to the third embodiment except that the positions of the electrode leads 271, 272 are reversed.

As shown in FIG. 12, the first to third nonaqueous electrolyte batteries 200A, 200C, 200C is arranged such that the electro group-housing part 202A of the first casing unit 220 of the second nonaqueous electrolyte battery 200B faces the unillustrated cap provided in the first nonaqueous electrolyte battery 200A and that the electro group-housing part 202A of the first casing unit 220 of the third nonaqueous electrolyte battery 200C faces the unillustrated cap provided in the second nonaqueous electrolyte battery 200B.

The battery pack 600 shown in FIG. 12 further includes the four bus bars 611-614.

The first bus bar 611 includes the lead connection part 611b and the external connection terminal 611e at the lead connection part 611b.

The protrusion is provided on the lead connection part 611b although an illustration is omitted. This protrusion is set on the through hole 223 (see FIG. 8) provided in the fixing part 221a of the first nonaqueous electrolyte battery 200A, and is welded to the main part 271a of the electrode lead 271 clamped by the fixing part 220a (see FIG. 8), 221a. For this reason, the first bus bar 611 is connected electrically to the main part 271a of the electrode lead 271 of the first nonaqueous electrolyte battery 200A. Herein, the unillustrated insulating resin layer is interposed between the lead connection part 611b and fixing part 221a. Therefore, the first bus bar 611 is electrically insulated from the fixing part 220a, 221a shown in FIG. 8. In the present embodiment, the fixing parts provided in the first to third nonaqueous electrolyte batteries 200A, 200B, 200C have the same perspective structures as the fixing part 220a (see FIG. 8), 221a shown in FIG. 8.

The through hole 611f is formed in the external connection terminal 611e. The external connection terminal 611e can be easily and rigidly connected to the external terminal of the electronic devices and/or other batteries by the screw clamp using the through hole 611f, for example.

The second bus bar 612 includes the first lead connection part 612a and the second lead connection part 612b at the first lead connection part 612a. The unillustrated protrusions are provided on the first and second lead connection parts 612a, 612b of the second bus bar 612, respectively.

The protrusion, which is provided on the first lead connection part 612a of the second bus bar 612, is set on the through hole 223 (see FIG. 8) provided in the fixing part 221a of the first nonaqueous electrolyte battery 200A in the same manner as the unillustrated protrusion provided in the lead connection part 611b of the first bus bar 611, and is welded to the main part 272a of the electrode lead 272 clamped by the fixing part 220a (see FIG. 8), 221a. For this reason, the second bus bar 612 is connected electrically to the main part 272a of the electrode lead 272 of the first nonaqueous electrolyte battery 200A. Also, the protrusion, which is provided on the second lead connection part 612b of the second bus bar 612, is set on the through hole 223 provided in the fixing part 221a of the second nonaqueous electrolyte battery 200B in the same manner as the unillustrated protrusion provided in the lead connection part 611b of the first bus bar 611, and is welded to the main part 271a of the electrode lead 271 clamped by the fixing part 220a, 221a. For this reason, the second bus bar 612 is connected electrically to the main part 271a of the electrode lead 271 of the second nonaqueous electrolyte battery 200B.

The third bus bar 613 has the same structure as the second bus bar 612. In other words, the third bus bar 613 includes the first lead connection part 613a and the second external lead connection part 613b at the first lead connection part 613a. The unillustrated protrusions are provided on the first and second lead connection parts 613a, 613b of the third bus bar 613, respectively.

The protrusion, which is provided on the first lead connection part 613a of the third bus bar 613, is set on the through hole 223 provided in the fixing part 221a of the second nonaqueous electrolyte battery 200B in the same manner as the unillustrated protrusion provided in the lead connection part 611b of the first bus bar 611, and is welded to the main part 272a of the electrode lead 272 clamped by the fixing part 220a, 221a. For this reason, the third bus bar 613 is connected electrically to the main part 272a of the electrode lead 272 of the second nonaqueous electrolyte battery 200B. Also, the protrusion, which is provided on the second lead connection part 613b of the third bus bar 613, is set on the through hole 223 provided in the fixing part 221a of the third nonaqueous electrolyte battery 200C in the same manner as the unillustrated protrusion provided in the lead connection part 611b of the first bus bar 611, and is welded to the main part 271a of the electrode lead 271 clamped by the fixing part 220a, 221a. For this reason, the third bus bar 613 is connected electrically to the main part 271a of the electrode lead 271 of the third nonaqueous electrolyte battery 200C.

The fourth bus bar 614 has the same structure as the first bus bar 611. In other words, the fourth bus bar 614 includes the lead connection part 614a and the external connection terminal 614e at the lead connection part 614a.

The unillustrated protrusion is provided on the lead connection parts 614a of the fourth bus bar 614.

This protrusion is set on the through hole 223 provided in the fixing part 221a of the third nonaqueous electrolyte battery 200C in the same manner as the unillustrated protrusion provided in the lead connection part 611b of the first bus bar 611, and is welded to the main part 271a of the electrode lead 271 clamped by the fixing part 220a, 221a. For this reason, the fourth bus bar 614 is connected electrically to the main part 272a of the electrode lead 272 of the third nonaqueous electrolyte battery 200C.

The through hole 614f is formed in the external connection terminal 614e of the fourth bus bar 614. The external connection terminal 614e can be easily and rigidly connected to the external terminal of the electronic devices and/or other batteries by the screw clamp using the through hole 614f, for example.

In this manner, in the battery pack 600 shown in FIG. 12, the first to third nonaqueous electrolyte batteries 200A, 200B, 200C are electrically connected in series through the second bus bar 612 and the third bus bar 613. Also, the battery pack 600 shown in FIG. 12 can achieve the electrical conduction to the electronic devices and/or other batteries through the external connection terminal 611e of the first bus bar 611 and the external connection terminal 614e of the fourth bus bar 614.

As described above with reference to FIG. 1 to FIG. 5C, the first to third nonaqueous electrolyte batteries 200A, 200B, 200C are the electrolyte battery in which the amount of moisture penetration from the outside of the battery is small and the service life is long.

Therefore, in the battery pack 600 shown in FIG. 12, it is possible to achieve the advantageous characteristics in that the amount of moisture penetration from the outside of the battery is small and the service life is long.

According to the sixth embodiment, the battery pack 600 having the aforementioned configuration can be provided. This battery pack includes the plural nonaqueous electrolyte batteries 200 of the third embodiments. Therefore, the battery pack of the sixth embodiment can easily and surely achieve the electrical conduction to the electronic devices and/or other batteries, and can achieve the advantageous characteristics in that the amount of moisture penetration from the outside of the battery is small and the service life is long.

[Seventh Embodiment]

Hereinafter, the seventh embodiment will be described.

Figure 13:
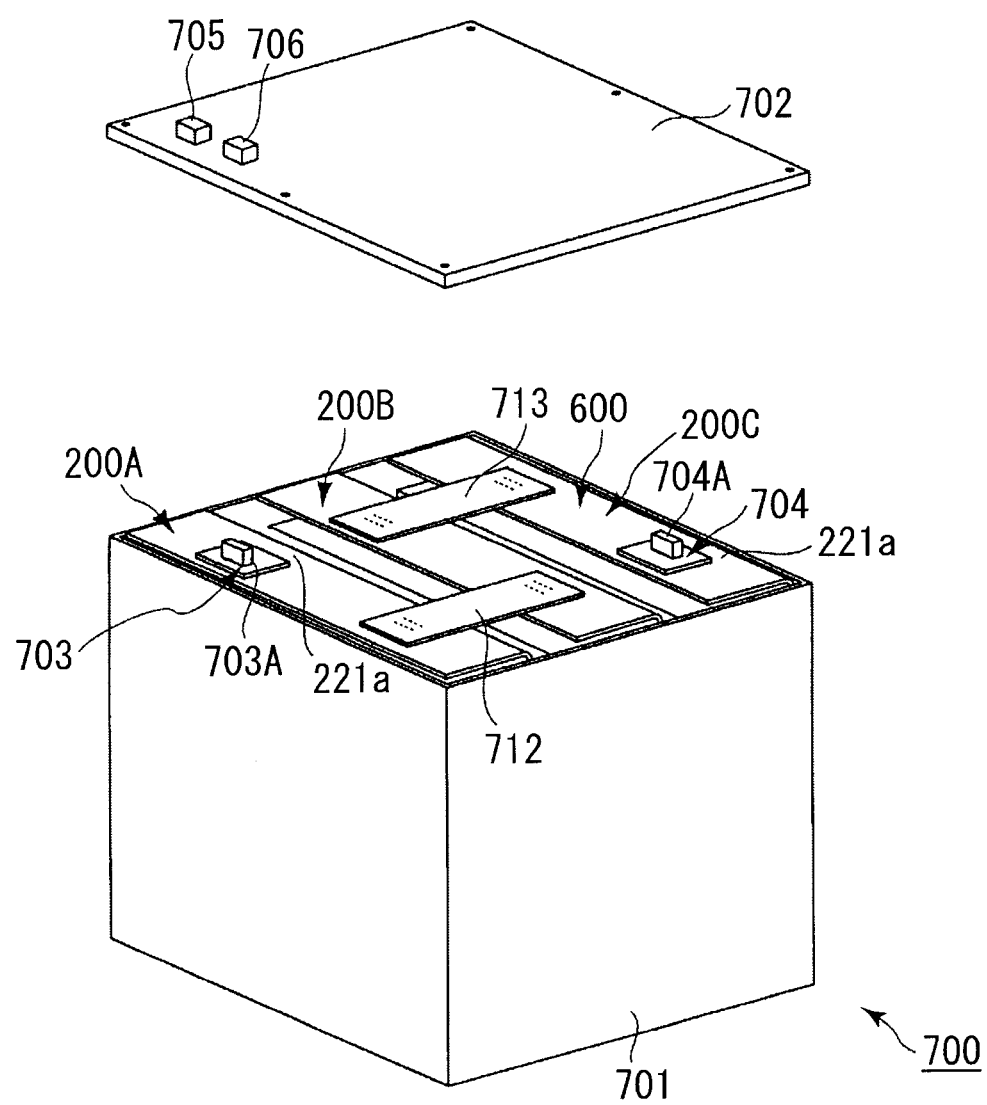
FIG. 13 is a perspective view illustrating a storage battery apparatus according to the seventh embodiment.

FIG. 13 is a schematic external view illustrating the storage battery apparatus 700 according to the seventh embodiment. This storage battery apparatus 700 according to the seventh embodiment includes the plural battery packs 600 of the sixth embodiment shown in FIG. 12 which are partially modified, and further includes the exterior package 701 which houses the battery packs.

In the following description, the same reference signs are put to the common constituent features of the nonaqueous electrolyte battery 1 described in the first embodiment with reference to FIG. 1 to FIG. 5C, the nonaqueous electrolyte battery 200 described in the third embodiment with reference to FIG. 7 and FIG. 8 and the battery pack 600 described in the sixth embodiment with reference to FIG. 12, and the detailed descriptions are omitted. Also, the constituent features which are unillustrated in FIG. 13 may be appropriately described with reference to the reference signs shown in FIG. 1 to FIG. 5C, FIG. 7, FIG. 8 and FIG. 12, etc.

As described above, the battery pack 600 included in the storage battery apparatus 700 shown in FIG. 13 is obtained by partially modifying the battery pack 600 of the sixth embodiment described with reference to FIG. 12. In other word, the battery pack 600 included in the storage battery apparatus 700 shown in FIG. 13 includes the three nonaqueous electrolyte batteries 200A, 200B, 200C. Also, this battery pack 600 further includes the second bus bar 612 and the third bus bar 613. The second bus bar 612 and the third bus bar 613 electrically connect the three nonaqueous electrolyte batteries 200A, 200B, 200C in series in the same manner as the second bus bar 612 and the third bus bar 613 of the battery pack 600 of the sixth embodiment shown in FIG. 12.

The battery pack 600 included in the storage battery apparatus 700 shown in FIG. 13 is different from the battery pack 600 of the sixth embodiment described with reference to FIG. 12 in terms of the absence of the first bus bar and the fourth bus bar. Instead, the battery pack 600 included in the storage battery apparatus 700 shown in FIG. 13 includes the positive electrode terminal connection part 703 and the negative electrode terminal connection part 704.

The positive electrode terminal connection part 703 has the two principal surfaces having a rectangular planar shape. In other words, in the positive electrode terminal connection part 703, the protrusion 703A is provided on one principal surface, and the protrusion is provided in the other principal surface although an illustration is omitted in FIG. 13. The positive electrode terminal connection part 703 is made of a conductive material such as a metal.

The unillustrated protrusion of the positive electrode terminal connection part 703 is set on the through hole 223 (see FIG. 8) provided in the fixing part 221a of the first nonaqueous electrolyte battery 200A, and is welded to the main part 271a of the electrode lead 271 clamped by the fixing part 220a (see FIG. 8), 221a. Therefore, the positive electrode terminal connection part 703 is connected electrically to the main part 271a of the electrode lead 271.

Although a detailed illustration is omitted, the positive electrode terminal connection part 703 is not brought into direct contact with the fixing part 220a, 221a of the first nonaqueous electrolyte battery 200A, and the insulating resin layer 208 is interposed therebetween. Therefore, the positive electrode terminal connection part 703 is electrically insulated from the fixing part 220a, 221 a of the first nonaqueous electrolyte battery 200A.

The negative electrode terminal connection part 704 has the same structure as the positive electrode terminal connection part 703. In other words, the negative electrode terminal connection part 704 has the two principal surfaces having a rectangular planar shape. In the negative electrode terminal connection part 704, the protrusion 704A is provided on one principal surface, and the unillustrated protrusion is provided in the other principal surface. The negative electrode terminal connection part 704 is made of a conductive material, and can be made of a metal, for example.

In the same manner as the one protrusion of the positive electrode terminal connection part 103, the unillustrated protrusion of the negative electrode terminal connection part 704 is set on the through hole 223 provided in the fixing part 221a of the third nonaqueous electrolyte battery 200C, and is welded to the main part 272a of the electrode lead 272 clamped by the fixing part 220a, 221 a. For this reason, the negative electrode terminal connection part 704 is connected electrically to the main part 272a of the electrode lead 272 of the third nonaqueous electrolyte battery 200C. Also, in the same manner as the positive electrode terminal connection part 703, the negative electrode terminal connection part 704 is not brought into direct contact with the fixing part 220a, 221 a of the third nonaqueous electrolyte battery 200C, and the insulating resin layer 208 is interposed therebetween. For this reason, the negative electrode terminal connection part 704 is electrically insulated from the fixing part 220a, 221a of the third nonaqueous electrolyte battery 200C.

The storage battery apparatus 700 shown in FIG. 13 further include the exterior package 701. The exterior package 701 has a substantially cubic shape, and is a hollow container having an opening at one end. The exterior package 701 is made of a synthetic resin having an insulation property such as modified polyphenylene ether (m-PPE).

The aforementioned battery pack 600 is housed in the exterior package 701. The protrusion 703A of the positive electrode terminal connection part 703 and the protrusion 704A of the negative electrode terminal connection part 704 of the battery pack 600 extend toward the opening of the exterior package 701.

The storage battery apparatus 700 shown in FIG. 13 further include the cap 702. The cap 702 includes the two principal surfaces parallel to each other, and the planer shapes thereof are a rectangular shape corresponding to the opening of the exterior package 701. The cap 703 can be made of a synthetic resin having an insulation property such as PPE in the same manner as the exterior package 701.

The cap 702 includes the positive electrode terminal 705 and negative electrode terminal 706 on the one principal surface. Also, the cap 702 includes the unillustrated positive electrode terminal wire and negative electrode terminal wire on the other principal surface. The positive electrode terminal wire is connected electrically to the positive electrode terminal 705. In the same manner, the negative electrode terminal wire is connected electrically to the negative electrode terminal 706. The positive electrode terminal 705, the negative electrode terminal 706, the positive electrode terminal wire and the negative electrode terminal are insulated electrically from the cap 702.

The cap 703 is fixed to the exterior package 701 such that the exterior package 701 is covered with the cap and the positive electrode terminal wire and the negative electrode terminal face the battery pack 200.

The positive electrode terminal wire is connected electrically to the protrusion 703A of the positive electrode terminal connection part 703 of the battery pack 600. For this reason, the positive electrode terminal 705 and the positive electrode terminal connection part 703 of the battery pack 600 are electrically connected. In the same manner, the negative electrode terminal wire is connected electrically to the protrusion 704A of the negative electrode terminal connection part 704 of the battery pack 600. For this reason, the negative electrode terminal 706 and the negative electrode terminal connection part 704 of the battery pack 600 are electrically connected.

In the present embodiment, the material and shape, etc. of the exterior package 701 included in the storage battery apparatus 700 is not particularly limited, and can be appropriately selected depending on an use application.

The storage battery apparatus 700 shown in FIG. 13 can be connected electrically to the external power generator and/or electronic devices through the positive electrode terminal 705 and the negative electrode terminal 706.

The storage battery apparatus 700 of the seventh embodiment include the battery pack 600 of the sixth embodiment, and thus, can easily and surely achieve the electrical conduction to the electronic devices and/or other batteries, and can achieve the advantageous characteristics in that the amount of moisture penetration from the outside of the battery is small and the service life is long.

Examples of the use application of the storage battery apparatus 700 of the seventh embodiment include smart grid batteries (the distributed power sources for the purpose of the storage and electric load leveling of renewable energy generated by solar power generation and wind power generation, load leveling of power), industrial backup storage batteries and household storage batteries. In the respective nonaqueous electrolyte batteries of the first to third embodiments, it is possible to significantly suppress moisture penetration from the outside of the battery and to prevent the battery from swelling. Also, it is possible to prevent the nonaqueous electrolyte from leaking to the outside, and thus, the nonaqueous electrolyte batteries of the first to third embodiments are highly reliable. Therefore, the storage battery device 700 of the seventh embodiment is particularly suitable as the use application such as the stationary storage battery system which requires long service life.

In the present embodiment, the storage battery apparatus 700 was described by using the example that uses the battery pack 600 of the sixth embodiment including the nonaqueous electrolyte battery 200 of the third embodiment, but is not limited thereto. For example, the battery apparatus 700 of the present embodiment can use the battery pack including the nonaqueous electrolyte battery 1 of the first embodiment or the nonaqueous electrolyte battery 100 of the second embodiment.

EXAMPLES

Hereinafter, the present invention will be described in more details with reference to the Examples and Comparative Examples, but the scope of the present invention is not limited to these examples. Also, the present invention can be carried out while making various changes in the details without departing from the spirit of the inventions.

Example 1

In the present Example, the nonaqueous electrolyte battery 1, which was the same as the nonaqueous electrolyte battery 1 shown in FIG. 1 to FIG. 5C, was produced by the following procedure except for the following differences. In other words, as shown in the schematic planar view of FIG. 14, the nonaqueous electrolyte battery 1 of the present Example was different from the example shown in FIG. 1 in that the battery case 2 did not include the bent part and include the four welded sealing parts 2C formed on the four end parts thereof.

<Production of Electrode Group 6>
(Production of Positive Electrode 3)

The slurry was prepared by adding 90 wt % of lithium manganese oxide ($LiMn_{1.9}Al_{0.1}O_4$) powder having the spinel type structure as a positive electrode active material, 5 wt % of acetylene black as a conductive agent, and 5 wt % of polyvinylidene fluoride (PVdF) in N-methylpyrrolidone (NMP), followed by mixing. Then, this slurry was applied to both surfaces of the positive electrode current collector 3a made of aluminum foil having a thickness of 15 μm, and the applied positive electrode current collector was dried and pressed to thereby produce the positive electrode having an electrode density of 2.9 g/cm$^3$.

This process produced the strip-shaped positive electrode 3 including the positive electrode current collector 3a, the positive electrode layers 3b supported by the both surfaces of the positive electrode current collector, and the positive electrode material-unsupported part 3c.

(Production of Negative Electrode 4)

The slurry was prepared by adding 90 wt % of lithium titanium oxide ($Li_4Ti_5O_{12}$) powder having the spinel type structure as a negative electrode active material, 5 wt % of acetylene black as a conductive agent, and 5 wt % of polyvinylidene fluoride (PVdF) in N-methylpyrrolidone (NMP), followed by mixing. Then, the slurry was applied to both surfaces of the negative electrode current collector 4a made of aluminum foil having a thickness of 15 μm, and the applied negative electrode current collector was dried and pressed to thereby produce the negative electrode having an electrode density of 2.3 g/cm$^3$.

Through this process, the strip-shaped negative electrode 4 including the negative electrode current collector 4a, the negative electrode layers 4b supported by the both surfaces of the negative electrode current collector, and the negative electrode material-unsupported part 4c.

(Production of Electrode Group 6)

Next, the separator which was the polyethylene porous film having a thickness of 20 μm was prepared as the separator 5.

Then, the strip-shaped positive electrode 3 and the strip-shaped negative electrode 4 were laminated while interposing the separator 5 therebetween, to thereby form the electrode group assembly. In this process, the positive electrode material-unsupported part 3c and the negative electrode material-unsupported part 4c were arranged so as to extend in the opposite direction to each other from the electrode group assembly.

Subsequently, the electrode assembly was spirally wound, and then, the winding core was taken out from the electrode group assembly and was pressed into a flat shape.

Then, a part of the positive electrode material-unsupported part 3c was clamped by the positive electrode current collector tab 32. In this state, the positive electrode material-unsupported part 3c and the positive electrode current collector tab 32 were ultrasonically welded. In the same manner, a part of the negative electrode material-unsupported part 4c was clamped by the negative electrode current collector tab 42, and in this state, the negative electrode material-unsupported part 4c and the negative electrode current collector tab 42 were ultrasonically welded.

Then, the overall electrode group assembly was covered with the insulating tape 61 except for the parts of the positive electrode material-unsupported part 3c, the positive electrode current collector tab 32, the negative electrode material-unsupported part 4c and the negative electrode current collector tab 42.

Through this process, the flat-shaped and wound electrode group 6 as shown in FIG. 3 and FIG. 4 was obtained.

<Connections Between Electrode Group 6 and Electrode Leads (Positive Electrode Lead and Negative Electrode Lead) 71, 72>

Next, the two stripe-shaped aluminum foils, which were the positive electrode lead (the electrode lead 71) and the negative electrode lead (the electrode lead 72), were prepared. Then, the prepared electrode lead (the positive electrode lead 71) was ultrasonically welded to the positive electrode current collector tab 32. In the same manner, the prepared electrode lead (the negative electrode lead 72) was ultrasonically welded to the negative electrode current collector tab 42.

<Production of Nonaqueous Electrolyte Battery 1>

Figure 14:
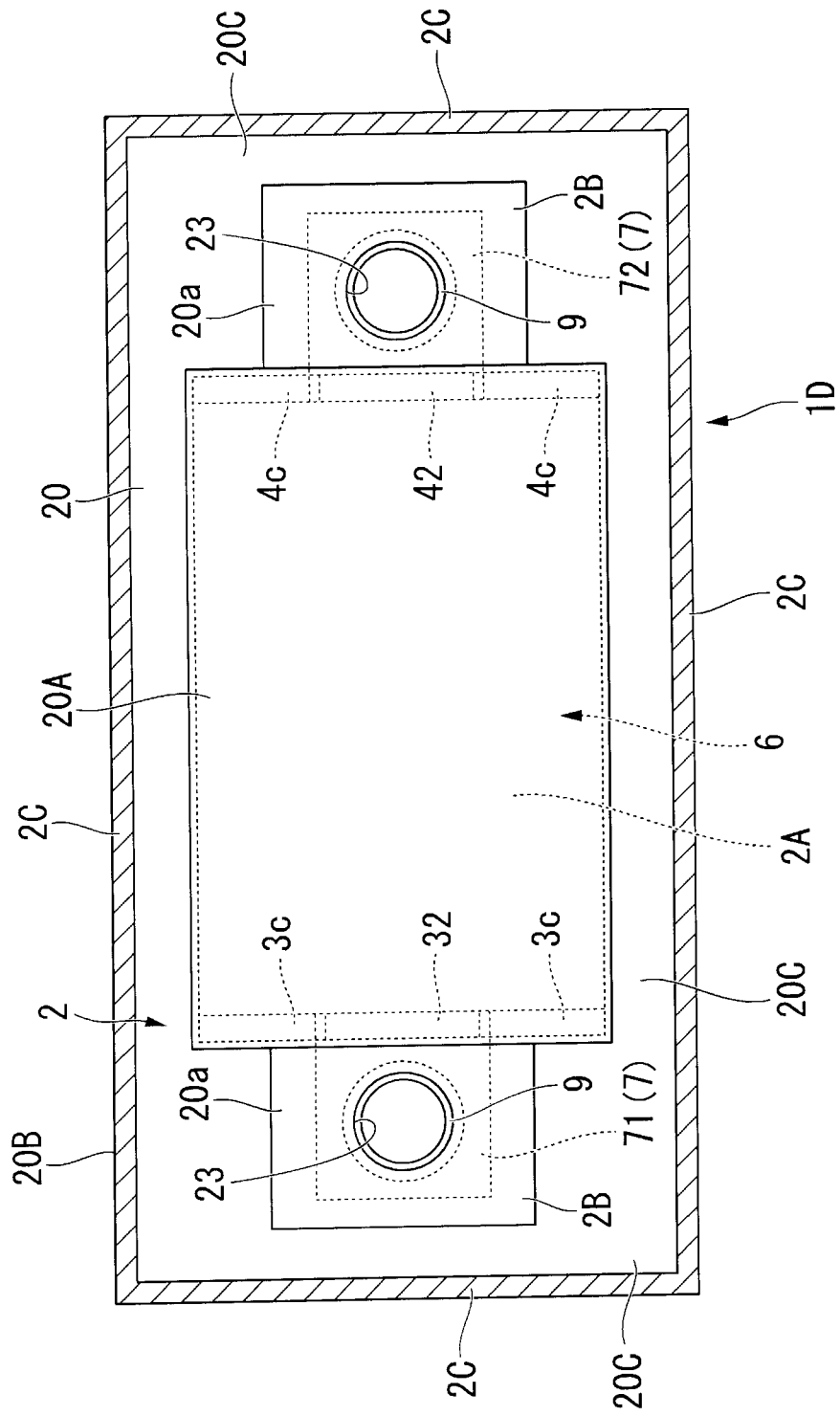
FIG. 14 is a schematic planar view illustrating the nonaqueous electrolyte battery produced in the Example.

Next, the battery case 2 as shown in FIG. 14 (see also FIG. 2) was prepared.

The battery case 2 is made of stainless steel (SUS304), and is comprised of the first casing unit 20 and the second casing unit 21. In the second casing unit 21, the concave-shaped housing part 20A as shown in FIG. 2 was formed through the deep drawing process.

In the second casing unit 21 prepared in the present example, the four corners of the housing part 20A was rounded as shown in FIG. 2.

As shown in FIG. 1 and FIG. 2, in the terminal-housing parts 2B, 2B, the through holes 23, 23 were formed respectively, and the diameter of the through holes 23, 23 was 7 mm. Moreover, the unillustrated injection port was formed in the housing part 20A.

The second casing unit 21 is a different object from the first casing unit 20, and is a plate-shaped member having the same size as the first casing unit 20 in a planar view.

As shown in FIG. 5A to FIG. 5C, the resin sealant 9 was provided in each of the peripheral parts of the through holes 23 of the terminal-housing parts 2B which were provided at the two places. Also, the overall surface of the terminal-housing part 2B of the first casing unit 20 was covered with the insulating resin layer 8 except for the injection port provided in the electrode group-housing part 2A and the part where the resin sealant 9 was provided. Also, the insulating resin layer 8 was arranged so as to cover the surface which faces the second casing unit 21 of the resin sealant 9. As shown in FIG. 5A to FIG. 5C, the overall surface of the second casing unit 21 which faces the first casing unit 20 was covered with the insulating resin layer 8.

Next, the electrode group 6 produced by the aforementioned procedure was placed in the housing part 20A of the first casing unit 20 of the battery case 2.

Then, the first casing unit 20 and the second casing unit 21 of the battery case 2 were arranged so as to face each other through the insulating resin layer 8. Accordingly, the electrode group 6 was housed in the electrode group-housing part 2A comprised of the housing part 20A of the first casing unit 20 and the housing unit 21A of the second casing unit 21 which faces the housing part 20A.

In this process, the electrode leads 71, 72 were clamped and fixed by the fixing part 20a of the first casing unit 20 and the fixing part 21a of the second casing unit 21 through the resin sealant layer 8.

Accordingly, the electrode leads 71, 72 are brought into contact with a part of the resin sealant 9 which covers the terminal-housing part 2B of the first casing unit 20 and a part of the insulating resin layer 8 which covers the surface of the part of the second casing unit 21 facing the terminal-housing part 2B of the first casing unit 20.

Also, the electrode leads 71, 72 were provided in the fixing part 20a of the terminal-housing part 2B, and were exposed through the through holes 23 covered with the resin sealant 9.

Then, the circumference of the electrode group-housing part 2A of the battery case 2 including the fixing parts 20a, 21 a was heated.

In this manner, the first casing unit 20 was heat-sealed to the second casing unit 22 through the resin sealant 9 and the insulating resin layer 8 which contacted the resin sealant. Also, the electrode leads 71, 72 were heat-sealed to the peripheral part of the through hole 23 of the fixing part 20a by the insulating resin layer 8A and the resin sealant 9. Moreover, the fixing part 21a of the second casing unit 21 was heat-sealed to the electrode leads 71, 72 through the insulating resin layer 8B.

Then, the four open ends of the battery case 2 were subjected to the seam welding, to thereby form the four welded sealing parts 2C as shown in FIG. 14 and seal the electrode group 6 in the battery case 2. Then, the vacuum drying was carried out at 80° C. for 24 hours.

In the present example, the heat-sealed structure was used, but the swaged part 20e shown in FIG. 5C can be used by providing the resin sealant 9 as shown in FIG. 5B, forming the part to be swaged 20b, and then subjecting this part to a swaging process.

<Preparation of Nonaqueous Electrolyte>

Ethylene carbonate (EC) and diethyl carbonate (DEC) were mixed in a volume ratio of 1:2 to thereby prepare the mixed solvent. Then, as an electrolyte, lithium hexafluorophosphate ($LiPF_6$) was dissolved into this mixed solvent at a concentration of 1.2 mol/L, to thereby prepare the liquid nonaqueous electrolyte.

<Injection of Nonaqueous Electrolyte and Completion of Nonaqueous Electrolyte Battery>

The liquid nonaqueous electrolyte obtained through the aforementioned procedure was injected through the unillustrated injection port provided in the housing party 20A of the first casing unit 20 of the battery case 2.

Finally, the unillustrated injection port provided in the housing party 20A of the first casing unit 20 of the battery case 2 was sealed to thereby obtain the nonaqueous electrolyte battery 1 of Example 1 which had a capacity of 15 Ah.

The electrode group-housing part 2A of the nonaqueous electrolyte battery 1 of Example 1 has the rectangular shape in a planar view of the outer size of 150 mm×110 mm (excluding the corners), and the height was 15 mm in the outer size. Also, the distance from the one peripheral side of the housing part 20A of the first casing unit 20 constituting the electrode group-housing part 2A of the nonaqueous electrolyte battery 1 of Example 1, from which the terminal-housing part 2B extends, to the welded sealing part 2C facing this peripheral side was 20 mm (2 places).

Example 2

The nonaqueous electrolyte battery 1 was produced in the same manner as in Example 1 except that the epoxy resin (a coefficient of thermal expansion: $45\times10^{-6}$/K, a glass transition temperature: 120° C.) was used instead of polyimide as the resin composition.

Example 3

The nonaqueous electrolyte battery 1 was produced in the same manner as in Example 1 except that the silica filler-containing epoxy resin (a coefficient of thermal expansion: $30\times10^{-6}$/K, a glass transition temperature: 140° C.) was used as the resin composition.

Example 4

<Production of Positive Electrode 3>

The slurry was prepared by adding 88 wt % of lithium—manganese—iron phosphate ($LiMn_{0.8}Fe_{0.2}PO_4$ (carbon-coating amount: 3 mass %)) powder having the olivine type structure as a positive electrode active material, 5 wt % of acetylene black as a conductive agent, and 7 wt % of polyvinylidene fluoride (PVdF) in N-methylpyrrolidone (NMP), followed by mixing. This slurry was applied to both surfaces of the positive electrode current collector 3a made of aluminum foil having a thickness of 15 μm, and the applied positive electrode current collector was dried and pressed to thereby produce the positive electrode having an electrode density of 2.0 g/cm³.

This process produced the strip-shaped positive electrode 3 including the positive electrode current collector 3a, the positive electrode layers 3b supported by the both surfaces of the positive electrode current collector, and the positive electrode material-unsupported part 3c.

<Production of Nonaqueous Electrolyte Battery>

Thereafter, the nonaqueous electrolyte battery 1 was produced in the same manner as in Example 1 except that the silica filler-containing epoxy resin (a coefficient of thermal expansion: $20\times10^{-6}$/K, a glass transition temperature: 140° C.) was used as the resin composition.

Example 5

The nonaqueous electrolyte battery 1 was produced in the same manner as in Example 4 except that stainless steel (SUS430) was used for the battery case 2 and the silica filler-containing epoxy resin (a coefficient of thermal expansion: $10\times10^{-6}$/K, a glass transition temperature: 160° C.) was used as the resin composition.

Example 6

The nonaqueous electrolyte battery 1 was produced in the same manner as in Example 4 except that the silica filler-containing epoxy resin (a coefficient of thermal expansion: $8\times10^{-6}$/K, a glass transition temperature: 160° C.) was used as the resin composition.

Comparative Example 1

In Comparative Example 1, the nonaqueous electrolyte battery was produced in the same manner as in Example 1 except for the following processes.

In Comparative Example 1, the battery case that has no through hole 23 shown in FIG. 1, FIG. 2 and FIG. 5A to FIG. 5C was prepared.

Then, in Comparative Example 1, the insulating resin layers that face each other (see the insulating resin layers 8A, 8B in FIG. 5A) were heat-sealed, and then, the fixing parts of the battery case were perforated so as to form the through holes that penetrate the fixing parts and the electrode leads (the positive electrode and negative electrode) clamped by the fixing parts at the two places. Then, the hollow gaskets were set on the battery case-penetrating parts of the through holes so as to come into contact with the parts.

Next, the rod-shaped members made of stainless steel were set on the through holes so as to pass through the hollow parts of the hollow gaskets and to come into contact with the electrode leads.

Finally, the aforementioned rod-shaped members that were set on the through holes were fixed with the nuts from the top and bottom of the battery case.

Through this procedure, the nonaqueous electrolyte battery of Comparative Example 1 was obtained.

In other words, in the nonaqueous electrolyte battery of Comparative Example 1, the battery case had the configuration that did not substantially include the fixing part 20a of the first casing unit 20 and the fixing part 21a of the second casing unit 21 which clamped the electrode leads 71, 72 such that the fixing parts 20a, 21a included in the battery case 2 of the nonaqueous electrolyte battery of Example 1, i.e. at least parts of the electrode leads 71, 72, were exposed through the through holes 23.

Comparative Example 2

In Comparative Example 2, the nonaqueous electrolyte battery was produced in the same manner as in Example 1 except for the following processes.

In the nonaqueous electrolyte battery of Comparative Example 2, the electrode leads, i.e. the respective positive electrode lead and negative electrode lead, were not brought into contact with the insulating resin layer covering the second casing unit, to thereby prepare the space between the electrode leads and the insulating resin layer covering the second casing unit.

In other words, in the nonaqueous electrolyte battery of Comparative Example 2, the battery case had the configuration that did not substantially include the fixing parts 20a, 21a included in the battery case 2 of the nonaqueous electrolyte battery 1 of Example 1, i.e. the fixing part 20a of the first casing unit 20 and the fixing part 21a of the second casing unit 21 which clamped the electrode leads 71, 72 such that at least parts of the electrode leads 71, 72, were exposed through the through holes 23.

Comparative Example 3

Figure 15:
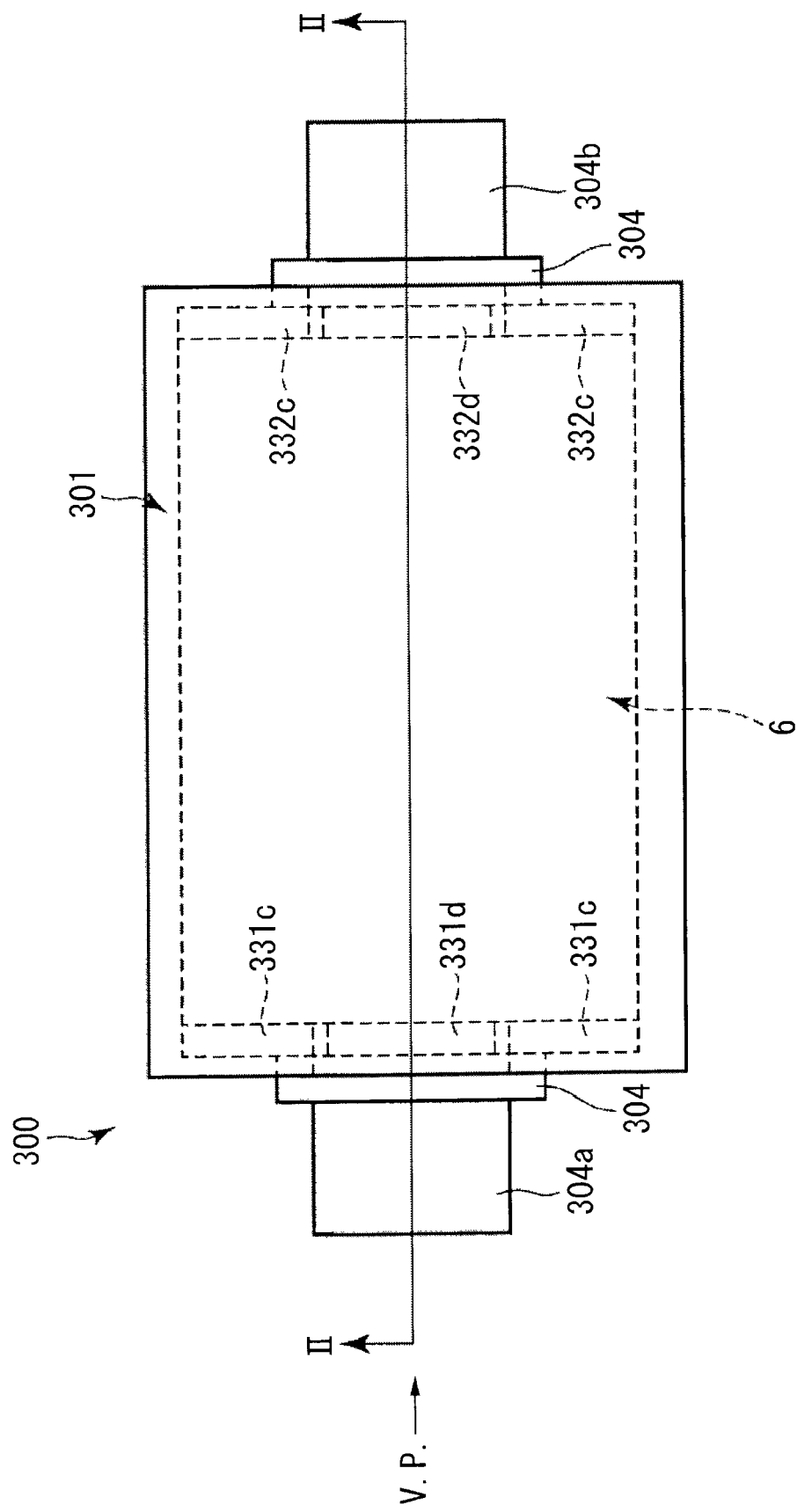
FIG. 15 is a schematic planar view illustrating the nonaqueous electrolyte battery produced in the Comparative Example.
Figure 16:
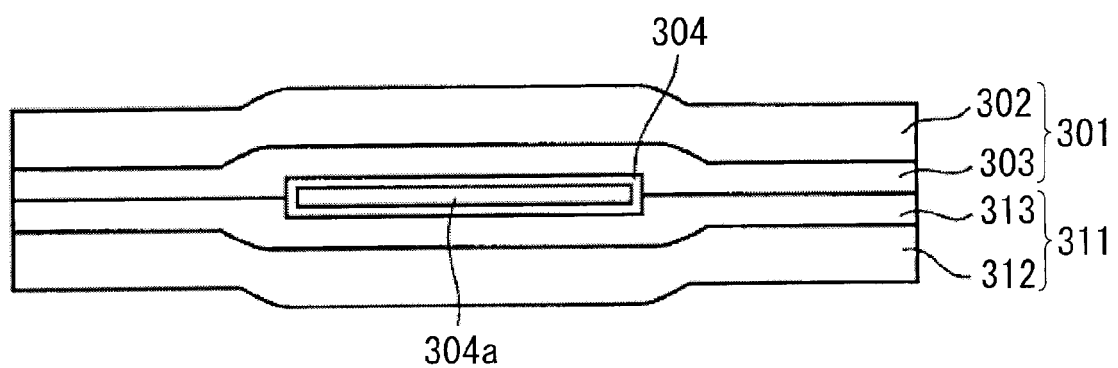
FIG. 16 is a schematic view illustrating a main part of the nonaqueous electrolyte battery when observed from the perspective of the V. P. direction shown in FIG. 15.

In Comparative Example 3, the nonaqueous electrolyte battery 300 shown in FIG. 15 was produced by the following procedure (see also FIG. 16).

FIG. 15 is the schematic planar view illustrating the nonaqueous electrolyte battery 300 of Comparative Example 3, and FIG. 16 is the schematic cross-sectional view illustrating the main part of the nonaqueous electrolyte battery 300 shown in FIG. 15 when observed from the perspective of the V. P. direction shown in FIG. 15.

In Comparative Example 3, firstly, the electrode group 6 was produced in the same manner as in Example 1. Then, in the same manner as in Example 1, the electrode lead 71, i.e. the positive electrode, was connected to the positive electrode current collector tab 32 of the electrode group 6, and the electrode lead 72, i.e. the negative electrode, was connected to the negative electrode current collector tab 42 of the electrode group 6.

Next, the two stainless laminated films 301, 311 were prepared.

The stainless laminated film 301 was comprised of the stainless steel 302 made of SUS430 and the thermoplastic resin layer 303 laminated on this stainless steel 302.

Although a detailed illustration is omitted, the stainless steel 302 was formed by the deep drawing process, and had the cup part having the enough size to house the previously produced electrode group 6, and the thermoplastic resin layer 303 conformally coated the stainless steel 302 so as to cover the inside of the cup part.

Also, the stainless laminated film 311 was comprised of the stainless steel 312 and the thermoplastic resin layer 313 laminated on this stainless steel 312. The stainless laminated film 311 was the plate-shaped member having the same planar shape as the stainless laminated film 301.

Then, the electrode group 6 was housed in the cup part of the stainless laminated film 301.

Subsequently, the stainless laminated films 301, 311 were arranged to face each other so as to bring a part of the thermoplastic resin layer 303 of the stainless laminated film 301 into contact with a part of the thermoplastic resin layer 313 of the stainless laminated film 311. In this process, the electrode lead (positive electrode lead) 304a connected to the electrode group 6 was sandwiched between the thermoplastic resin layers 303, 313 through the resin layer 304 as shown in FIG. 15 and FIG. 16. In the same manner, the electrode lead (negative electrode lead) 304b connected to the electrode group 6 was sandwiched between the thermoplastic resin layers 303, 313 through the resin layer 304. The resin layer 304 used herein was comprised of the heat-resistant layer and the adhesive layer. Also, as shown in FIG. 15, a part of the resin layer 304 was arranged to extend from the stainless laminated films 301, 311 to the outside.

Then, the peripheral parts of the stainless laminated films 301, 311 facing each other were heated to heat-seal the thermoplastic resin layers 303, 313 coming into contact with each other. At the same time, the electrode lead 304a was heat-sealed to the thermoplastic resin layer 313 and the resin layer 304 coming into contact with the electrode lead. In the same manner, the electrode lead 304b was heat-sealed to the thermoplastic resin layer 313 and the resin layer 304 coming into contact with the electrode lead. Moreover, the resin layer 304 was heat-sealed to the thermoplastic resin layers 303, 313 coming into contact with the resin layer.

Through this procedure, the nonaqueous electrolyte battery 300 of Comparative Example was produced as shown in FIG. 15 (see also FIG. 16).

When the nonaqueous electrolyte battery 300 was observed from the perspective of the V. P. direction shown in FIG. 15, it was possible to observe the shape shown in FIG. 16. In other words, in the nonaqueous electrolyte battery 300, the stainless steels 302, 312 of the stainless laminated films 301, 311, which sandwich the electrode lead 304a and the resin layer 304, and the thermoplastic resin layer 303, 313 were deformed for the electrode lead 304a and resin layer 304. Although a detailed illustration is omitted, the stainless steels 302, 312 of the stainless laminated films 301, 311, which sandwich the electrode lead (the negative electrode lead) 304b and the resin layer 304, and the thermoplastic resin layer 303, 313 were deformed in the same manner as shown in FIG. 16.

Herein, the cup part of the nonaqueous electrolyte battery 300 of Comparative Example 3 had the planar shape of the outer size of 150 mm×110 mm (excluding the corner part R2), and the height of the outer size was 15 mm.

Comparative Example 4

The nonaqueous electrolyte battery was produced in the same manner as in Comparative Example 3 except for using the positive electrode 3 that was the same as used in Example 4 (the positive electrode active material: the olivine type lithium-manganese-iron phosphate ($LiMn_{0.8}Fe_{0.2}PO_4$ (carbon-coating amount: 3 mass %))).

[Evaluation Methods]
<Capacity Evaluation>

The charging and discharging cycles were carried out under the condition of 25° C. at a rate of 1 C once each of the nonaqueous electrolyte batteries of Examples 1-6 and Comparative Examples 1-4, and the initial discharging capacities were measured. Table 1 shows the results.

<Durability Test>

The nonaqueous electrolyte batteries of Examples 1-6 and Comparative Examples 1-4 were produced 50 pieces each thereof, and the thicknesses of the batteries were measured under the conditions of 25° C. and the charge amount of 50% (SOC50%).

Thereafter, the nonaqueous electrolyte batteries of the respective Examples and Comparative Examples were stored for 3 months in the constant-temperature and constant-humidity chamber in which the temperature and humidity were adjusted to 60° C. and 93%, respectively.

Then, the nonaqueous electrolyte batteries were taken out of the constant-temperature and constant-humidity chamber, and were left under the condition of 25° C. When the battery temperatures returned to 25° C., the thicknesses were measured. Table 1 shows the increasing rates of the battery thicknesses {=(battery thickness after storage)−(battery thickness before storage)/battery thickness before storage} based on these measurement results.

Also, the batteries after the storage were discharged at a rate of 1 C, and then the charging and discharging cycles were carried out under the condition of 25° C. at a rate of 1 C once each of the batteries. Then, the measured discharging capacities were regarded as the recovered capacities, and Table 1 shows the recovered capacity ratios (=recovered capacity/initial discharging capacity×100) based on these measurement results.

In addition, the increasing ratio of the battery thickness and the recovered capacity ratio indicate the average values of 50 samples of the Examples and Comparative Examples.

TABLE 1

| | Casing material | Positive electrode material | Resin composition | Filler type | Coefficient of thermal expansion (×10$^{-6}$/K) | Tg (° C.) | Initial discharging capacity (Ah) | Increasing rate of battery thickness (%) | Recovered capacity ratio (%) |
|---|---|---|---|---|---|---|---|---|---|
| Example 1 | Stainless steel (sus304) | $LiMn_2O_4$ | Polyimide | — | 50 | — | 15.0 | 4 | 95 |
| Example 2 | Stainless steel (sus304) | $LiMn_2O_4$ | Epoxy resin | — | 45 | 120 | 15.2 | 3 | 94 |
| Example 3 | Stainless steel (sus304) | $LiMn_2O_4$ | Filler-containing epoxy resin | Silica | 30 | 140 | 15.0 | 2 | 95 |
| Example 4 | Stainless steel (sus304) | $LiMn_{0.8}Fe_{0.2}PO_4$ | Filler-containing epoxy resin | Silica | 20 | 140 | 15.2 | 3 | 97 |
| Example 5 | Stainless steel (sus304) | $LiMn_{0.8}Fe_{0.2}PO_4$ | Filler-containing epoxy resin | Silica | 10 | 160 | 15.1 | 2 | 97 |
| Example 6 | Stainless steel (sus304) | $LiMn_{0.8}Fe_{0.2}PO_4$ | Filler-containing epoxy resin | Silica | 8 | 160 | 15.1 | 2 | 97 |
| Comparative Example 1 | Stainless steel (sus304) | $LiMn_2O_4$ | — | — | — | — | 15.0 | 51 | 61 |
| Comparative Example 2 | Stainless steel (sus304) | $LiMn_2O_4$ | — | — | — | — | 15.1 | 32 | 68 |
| Comparative Example 3 | Stainless steel (sus304) | $LiMn_2O_4$ | — | — | — | — | 15.0 | 95 | 40 |
| Comparative Example 4 | Stainless steel (sus304) | $LiMn_{0.8}Fe_{0.2}PO_4$ | — | — | — | — | 15.2 | 100 or more | 37 |

Tg: grass transition temperature

[Evaluation Results]

From the results shown in Table 1, it was revealed that the increasing rates of the battery thickness were small in the nonaqueous electrolyte batteries of Examples 1-6 as compared to the nonaqueous electrolyte batteries of Comparative Examples 1-4. Also, it was revealed that the gas generation in the nonaqueous electrolyte batteries of Examples 1-6 was suppressed as compared to the nonaqueous electrolyte batteries of Comparative Examples 1-4.

Also, it was revealed that the high recovered capacity ratios and the excellent durability were shown in the nonaqueous electrolyte batteries of Examples 1-6. These results were clearly because it was possible to prevent moisture from penetrating into the inside of the battery case and reaching the electrode group 6 housed in the electrode group-housing part 2A of the battery case 2 in the nonaqueous electrolyte batteries of Examples 1-6. Also, these results were clearly because it was possible to prevent the deterioration of the electrode group 6 for a long period.

Also, the through hole 23 was formed in the fixing part 20a provided in the battery case 2 of each of the nonaqueous electrolyte batteries of Examples 1-6, and the periphery thereof was heat-sealed by the resin sealant 9. This heat-sealed resin sealant 9 was excellent in sealing property, and thus, it was possible to efficiently prevent moisture from penetrating into the inside of the battery case 2 and reaching the electrode group 6 housed in the electrode group-housing part 2A of the battery case 2. That is one of the reasons why the excellent durability was shown in the nonaqueous electrolyte batteries of Examples 1-6.

Moreover, in the nonaqueous electrolyte batteries of Examples 1-6, the moisture penetration into the inside of the battery case 2 could be much efficiently prevented by the four welded sealing parts 2C that were subjected to seam welding in the battery case 2. That is another reason why the excellent durability was shown in the nonaqueous electrolyte batteries of Examples 1-6.

On the other hand, as shown in the results of Table 1, the nonaqueous electrolyte battery of Comparative Example 1 had the lower durability than the nonaqueous electrolyte batteries of Examples 1-6. It can be considered as the reason that the formation of the through hole that passed through the heat-sealed structure could generate the stress which deteriorated the sealing property of the heat-sealed structure and allowed moisture to penetrate into the inside of the battery case in the nonaqueous electrolyte battery of Comparative Example 1.

Also, in the same manner as in Comparative Example 1, the nonaqueous electrolyte battery of Comparative Example 2 had the lower durability than the nonaqueous electrolyte batteries of Examples 1-6. It can be considered as the reason that moisture passed through the respective spaces between the cap and the electrode leads (the positive electrode lead and negative electrode lead), and reached the electrode group 6 in the nonaqueous electrolyte battery of Comparative Example 2.

The non-aqueous electrolyte cell 300 of Comparative Example 3 and Comparative Example 4 also, the durability was low as compared with the non-aqueous electrolyte batteries of Examples 1 to 6. Partial This result, electrode lead 304a, 304b is to have mutually heat-sealing the edges of the stainless laminate film 301 and 311 extending has been modified as shown in FIG. 16, the thermoplastic resin layer 303, 313 since the slight gap had occurred between, it is this gap attributed to the fact that it has reached the electrode group 6 through water.

As described above, the non-aqueous electrolyte batteries of Examples 1-6 had the more excellent durability than the nonaqueous electrolyte batteries of Comparative Examples 1-4, and thus can achieve a long service life.

According to at least one of the embodiments and examples described above, the nonaqueous electrolyte battery of the present invention is provided. As described above, this nonaqueous electrolyte battery includes the resin sealant which seals the space between the terminal-housing part and the electrode lead exposed through the through hole, wherein the resin sealant is circularly formed in the through hole along the peripheral part of the through hole and is formed of the resin composition having a coefficient of thermal expansion within a range of 8 to 50 ($\times 10^{-6}$/K) at 0° C. to 100° C. For this reason, the nonaqueous electrolyte battery can prevent the moisture contact of the electrode group housed in the battery case, and conclusively can prevent the deterioration of the nonaqueous electrolyte battery. Therefore, this nonaqueous electrolyte battery can achieve a long service life.

Moreover, the aforementioned nonaqueous electrolyte battery of the first embodiment can easily and surely obtain the electrical conduction to the electronic devices and/or other batteries through the parts, which were exposed through the through holes provided in the fixing parts clamping the leads, of the electrode leads.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A nonaqueous electrolyte battery comprising:
   an electrode group having a positive electrode and a negative electrode;
   a pair of plate-shaped terminal parts connected electrically to the positive electrode and the negative electrode of the electrode group;
   a metallic battery case comprising an electrode group-housing part which houses the electrode group, a terminal-housing part which communicates with the electrode group-housing part and houses the terminal part, and a welded sealing part which seals the electrode group-housing part and the terminal-housing part, wherein a through hole exposing a part of the terminal part is formed on the terminal-housing part; and
   a resin sealant which seals a space between the terminal-housing part and the terminal part exposed by the through hole,
   wherein the end part of the pair of plate-shaped terminal parts are accommodated in the terminal-housing part, the battery case is comprised of a first casing unit and a second casing part which are joined by the welded sealing part,
   the terminal-housing part is comprised of a plate-shaped fixing part which is extended from the electrode group-housing part of the first casing unit and a plate-shaped fixing part which is extended from the electrode group-housing part of the second casing part,
   the respective fixing parts face each other across the terminal part,
   the terminal part is fixed by the respective fixing parts,
   the through hole is formed in at least one of the plate-shaped fixing part of the first casing unit and the plate-shaped fixing part of the second casing part, and
   the resin sealant is provided in a ring shape in the through hole along the peripheral part of the through hole and is formed of a thermosetting resin composition having a coefficient of thermal expansion within a range of 8 to 50 ($\times 10^{-6}$/K) at 0° C. to 100° C.

2. The nonaqueous electrolyte battery according to claim 1, wherein the thermosetting resin composition has a glass transition temperature of 120° C. or higher.

3. The nonaqueous electrolyte battery according to claim 1, wherein the thermosetting resin composition is an epoxy based resin composition containing an inorganic filler.

4. The nonaqueous electrolyte battery according to claim 1, wherein an insulating resin layer is interposed between the fixing part and the terminal part.

5. The nonaqueous electrolyte battery according to claim 4, wherein the insulating resin layer is bonded, crimped or heat-sealed to the fixing part and the terminal part.

6. The nonaqueous electrolyte battery according to claim 1, wherein the terminal-housing part is bent toward the electrode group-housing part.

7. The nonaqueous electrolyte battery according to claim 1, wherein there are two terminal-housing parts, the terminal part connected to the positive electrode is present in one terminal-housing part, and the terminal part connected to the negative electrode is present in the other terminal-housing part.

8. The nonaqueous electrolyte battery according to claim 1, wherein the electrode group-housing part and the terminal-housing part are enclosed by the welded sealing part.

9. A battery pack comprising:
the plural nonaqueous electrolyte batteries according to claim 1; and
a bus bar which electrically connects the terminal parts of the nonaqueous electrolyte batteries, wherein
the bus bar is connected to the terminal parts, which are exposed by the through holes, of the terminal parts of the nonaqueous electrolyte batteries.

10. A storage battery apparatus comprising:
the battery pack according to claim 9; and
an exterior package which houses the battery pack.

11. The nonaqueous electrolyte battery according to claim 1, wherein the battery case is made from any one of the group consisting of stainless steel, nickel-plated stainless steel, and nickel-plated steel plate.

12. The nonaqueous electrolyte battery according to claim 1, wherein the negative electrode includes a negative electrode layer that includes a negative electrode active material, and
wherein the negative electrode active material is made of titanium-containing metal composite oxides, or titanium-based oxides.

13. The nonaqueous electrolyte battery according to claim 1, wherein the welded sealing part is sealed by seam welding.

* * * * *